(12) United States Patent
Peterson

(10) Patent No.: US 6,685,879 B2
(45) Date of Patent: Feb. 3, 2004

(54) PROCESS AND APPARATUS FOR REGENERATING CARBON MONOXIDE AND HEATING STEEL

(76) Inventor: Oren V. Peterson, 1250 W. 2600 North, Pleasant Grove, UT (US) 84062

( * ) Notice: Subject to any disclaimer, the term of this patent is extended or adjusted under 35 U.S.C. 154(b) by 333 days.

(21) Appl. No.: 09/736,515

(22) Filed: Dec. 13, 2000

(65) Prior Publication Data

US 2003/0168787 A1 Sep. 11, 2003

Related U.S. Application Data

(63) Continuation of application No. 09/610,842, filed on Jul. 5, 2000, now Pat. No. 6,464,860.

(51) Int. Cl.$^7$ ............................................... C21D 1/06
(52) U.S. Cl. ...................................... 266/252; 432/127
(58) Field of Search ................................ 266/249, 252; 423/418.2; 432/127

(56) References Cited

U.S. PATENT DOCUMENTS

| | | | |
|---|---|---|---|
| 1,525,725 A | * | 2/1925 | Dressler ..................... 266/252 |
| 1,539,833 A | | 6/1925 | Fahrenwald |
| 1,791,166 A | | 2/1931 | Kathner |
| 1,833,132 A | | 11/1931 | Shoffstall et al. |
| RE19,205 E | | 6/1934 | Blythe |
| 2,883,172 A | | 4/1959 | Mitchell |
| 2,929,614 A | | 3/1960 | Young et al. |
| 3,503,868 A | | 3/1970 | Shields |
| 3,652,447 A | | 3/1972 | Yant |
| 3,770,103 A | | 11/1973 | Ball et al. |
| 3,941,423 A | | 3/1976 | Garte |
| 4,028,222 A | | 6/1977 | Prull |
| 4,243,378 A | | 1/1981 | Chronberg |
| 4,304,656 A | | 12/1981 | Lee |
| 4,357,231 A | | 11/1982 | Estes et al. |
| 4,505,809 A | | 3/1985 | Brunner et al. |
| 4,536,278 A | | 8/1985 | Tatterson et al. |
| 4,544,477 A | | 10/1985 | Taylor |
| 4,545,622 A | | 10/1985 | Yang |
| 4,548,702 A | | 10/1985 | York et al. |
| 4,670,104 A | | 6/1987 | Taylor |
| 4,884,967 A | * | 12/1989 | Meyer ......................... 432/127 |
| 4,994,175 A | | 2/1991 | Hargreaves et al. |
| 5,009,770 A | | 4/1991 | Miller et al. |
| 5,441,407 A | | 8/1995 | Stamm et al. |
| 6,464,860 B1 | * | 10/2002 | Peterson ..................... 208/400 |

OTHER PUBLICATIONS

George J. McManus, Reheat Revolution, vol. 9, No. 6, Iron Age, The Management Magazine for Metal Producers, pp. 16–20, Jun. 1993.

* cited by examiner

*Primary Examiner*—Scott Kastler
(74) *Attorney, Agent, or Firm*—Clayton, Howarth & Cannon, P.C.

(57) ABSTRACT

A steel reheat furnace and method of use thereof are disclosed. The furnace includes a housing defining an interior furnace space that is substantially sealed from the environment. A carbon monoxide atmosphere is placed in the interior furnace space for enveloping the steel and protecting it from oxidation. Oxidation of the carbon monoxide generates heat that reheats the steel for later rolling into rolled steel. Flue gases are removed from the furnace by a furnace hood and flue system. The steel advances through the furnace by a roller system driven by frictional force.

104 Claims, 9 Drawing Sheets

PROCESS AND APPARATUS FOR REGENERATING CARBON MONOXIDE AND HEATING STEEL

CROSS-REFERENCE TO RELATED APPLICATIONS

This application is a continuing application of U.S. patent application Ser. No. 09/610,842, filed Jul. 5, 2000, now U.S. Pat. No. 6,464,860 issues Oct. 15, 2000 entitled "Process and Apparatus for Generating Carbon Monoxide and Extracting Oil from Oil Shale," which is hereby incorporated herein by reference in its entirety.

STATEMENT REGARDING FEDERALLY SPONSORED RESEARCH OR DEVELOPMENT

Not Applicable.

BACKGROUND OF THE INVENTION

The present invention relates generally to steel production, and more particularly, but not necessarily entirely, to a steel heating furnace with particular use in reheating previously cast steel.

In the steel making industry, it is known to produce steel and store it in slabs in sizes required by the provider. This is often accomplished by (i) dispensing newly formed steel from a continuous caster in the form of slabs, during which the steel slabs unavoidably cool to a temperature below the desired working temperature of the steel, (ii) feeding the slabs of steel through a reheat furnace to thereby heat the steel slab to a working temperature, and then (iii) compressively rolling the steel slabs into a reduced thickness. This type of steelmaking system is thus summarized briefly as comprising a caster, reheat furnace, and roll line, utilized in sequence in that order.

A newly cast continuous slab of steel is initially quite thick as it is dispensed from the caster. The slab might for example be 25.4 cm (10 inches) thick. Although the steel has a temperature of perhaps 815° C. (1500° F.) when it is dispensed from the caster, it generally requires a working temperature maintained above 982° C. (1800° F.) while it is rolled into the desired thickness. Naturally, the hotter the steel, the easier it can be rolled, such that a temperature of 2200° F. is preferred. The newly cast steel slab can either be stored somewhere to be reheated and rolled later, or it can be heated immediately to the higher working temperature and rolled right after casting. Naturally, less energy is required to heat the steel slab from 815° C. (1500° F.) to a working temperature above 982° C. (1800° F.) directly after casting than would be required if the steel is stored temporarily after casting and allowed to cool to ambient temperature prior to rolling. It is therefore desirable, in steel casting operations, to utilize the caster, reheat furnace, and roll line in direct succession.

It is futile to attempt to roll steel unless the slab of steel is heated to a working temperature well above 982° C. (1800° F.), such that the temperature of all portions of the steel is maintained above 982° C. (1800° F.). When the steel slab is heated to the working temperature, it is fed through the rollers in the roll line, which roll and compress the steel to a reduced thickness using roll line machinery and processes known to those having ordinary skill in the field. For example, a slab of steel cast at 25.4 cm (10 inches) thick can be reheated and rolled to a reduced thickness of 0.16 cm (1/16 of an inch) or thinner.

Several attempts have been made to construct a steel heating furnace that works efficiently. Many such attempts are described in the following U.S. patents, which are incorporated herein by reference: U.S. Pat. No. 1,539,833; U.S. Pat. No. 1,791,166; U.S. Pat. No. 1,833,132; U.S. Pat. No. 2,883,172; U.S. Pat. No. 2,929,614; U.S. Pat. No. 3,770,103; U.S. Pat. No. 4,243,378; U.S. Pat. No. 5,441,407; and U.S. Pat. No. Re. 19,205.

The known steel reheat furnaces generally burn natural gas or a hydrocarbon fuel within the furnace to provide the heat. The gas or fuel combusts to form super-heated water vapor and carbon dioxide. The water vapor reacts with the steel to form a magnetic iron oxide ($Fe_3O_4$) on the surface of the steel being reheated, in the form of an undesirable crusty, abrasive surface scale. The iron oxide scale must be removed before rolling, otherwise, the iron oxide scale becomes rolled right into the steel surface during rolling and becomes a defect in the steel, such defects sometimes being referred to as "pits." Sometimes slivers of the iron oxide are rolled into the steel.

The prior art reheat furnaces are not sealed from the atmosphere, and in fact have openings along their sides. To prevent the gas-burning flames from venturing through the open sides and outside the furnace, a pressure monitoring system is utilized in which the pressure within the furnace matches the surrounding atmospheric pressure. This pressure matching system of operation, when utilized in a reheat furnace having side openings, carries the risk of leaking some gas into the atmosphere because the matching pressure varies and therefore cannot be completely reliable.

Common types of reheat furnaces include a "pusher furnace," a "walking beam" furnace, and a "roller hearth" or "tunnel" furnace. In the walking beam furnaces and in the pusher-type furnaces there is a high degree of surface contact of the steel slabs with the slab supports, particularly in the pusher-type furnaces. Such surface contact causes the slab supports to absorb heat from the steel, often undesirably scoring the slab and producing "cold spots" on the steel slab. These cold spots can result in an inconsistent thickness in the rolled steel. Although the conventional roller hearth type furnace has the advantage of uniformly heating the steel slabs without damaging or marking the surface, it also has the disadvantage of causing excessive heat loss, and the rollers are highly expensive.

The prior art reheat furnaces are thus characterized by several disadvantages that are addressed by the present invention. The present invention minimizes, and in some aspects eliminates, the above-mentioned failures, and other problems, by utilizing the methods and structural features described herein.

In view of the foregoing, it will be appreciated that a steel heating furnace that can significantly reduce oxidation of the surface of the steel, and provide for a controlled atmosphere during reheating, and reduce cold spots and thus increase the consistency of thickness of rolled steel, and improve efficiency of reheating steel, and avoids damaging or marking the surface of the steel, would be a significant advancement in the art.

BRIEF SUMMARY OF THE INVENTION

It is therefore an object of the present invention to provide a steel heating furnace that is simple in concept.

It is another object of the present invention to provide such a steel heating furnace that minimizes the occurrence of iron oxide forming in the surface of the steel.

It is a further object of the present invention, in accordance with one aspect thereof, to provide a steel heating furnace in which the use of hydrocarbon fuel, such as natural gas, is avoided during operation.

It is an additional object of the present invention, in accordance with one aspect thereof, to provide a steel heating furnace in which the occurrence of water vapor within the furnace is minimized.

It is yet another object of the present invention, in accordance with one aspect thereof, to provide a steel heating furnace in which a carbon monoxide atmosphere is maintained within the furnace during operation.

It is a still further object of the present invention, in accordance with one aspect thereof, to provide a steel heating furnace capable of enabling steel to be heated with an unoxidized finish.

It is an additional object of the present invention, in accordance with one aspect thereof, to provide a steel heating furnace in which steel within the furnace is more evenly heated.

The above objects and others not specifically recited are realized in a specific illustrative embodiment of a steel heating furnace, comprising:

- a furnace housing for receiving steel thereinto, the furnace housing defining an interior furnace space;
- means for heating the interior furnace space and the steel residing within the furnace; and
- means for supplying carbon monoxide into the interior furnace space and maintaining a carbon monoxide atmosphere within the interior furnace space.

Another illustrative embodiment of the invention comprises:

- a furnace housing for receiving steel thereinto, the furnace housing defining an interior furnace space;
- means for heating the interior furnace space and the steel residing within the furnace; and
- means for substantially sealing the furnace housing from the atmosphere.

Still another illustrative embodiment of the invention comprises:

- a furnace housing for receiving steel thereinto, the furnace housing comprising sides, an entrance, and an exit opening, and wherein the furnace housing is sealed along its sides from the atmosphere and defines an interior furnace space;
- means for heating the interior furnace space and the steel residing within the furnace; and
- means for blocking the entrance and the exit opening of the furnace housing from the atmosphere to inhibit the entry of ambient air into the furnace housing.

Yet another illustrative embodiment of the invention comprises:

- a furnace housing for receiving steel thereinto, the furnace housing having sides and defining an interior furnace space;
- means for heating the interior furnace space and the steel residing within the furnace; and
- rollers rotatably disposed within the furnace housing for supporting steel thereupon, wherein the rollers are fully confined within the furnace housing without extending beyond the sides of the furnace.

A still further illustrative embodiment of the invention comprises:

- a furnace housing for receiving steel thereinto, the furnace housing defining an interior furnace space;
- means for heating the interior furnace space and the steel residing within the furnace; and
- a plurality of support roller means rotatably disposed within the furnace housing for supporting steel thereupon, wherein each support roller means comprises a series of spaced-apart, co-axial wheels.

Another illustrative embodiment of the invention comprises:

- a furnace housing for receiving steel thereinto, the furnace housing defining an interior furnace space;
- means for heating the interior furnace space and the steel residing within the furnace;
- a plurality of support roller means rotatably disposed within the furnace housing for supporting steel thereupon; and
- a plurality of stabilizer roller means disposed beneath, and in alignment with, the roller means, respectively.

Still another illustrative embodiment of the invention comprises a steel heating furnace, comprising:

- a furnace housing for receiving steel thereinto, the furnace housing having sides and defining an interior furnace space;
- means for heating the interior furnace space and the steel residing within the furnace; and
- support rollers rotatably and removably disposed within the furnace housing for supporting steel thereupon, such that said rollers are interchangeable.

Yet another illustrative embodiment of the invention comprises:

- a furnace housing for receiving steel thereinto, the furnace housing having sides and defining an interior furnace space;
- means for heating the interior furnace space and the steel residing within the furnace;
- support rollers rotatably disposed within the furnace housing for supporting steel thereupon; and
- advancing means for advancing steel through the furnace housing without imparting a direct torsion driving force to the support rollers. As used herein, "direct torsion driving force" means the force imparted by direct attachment to a driven member, such as a belt or chain, by means of a sprocket, pulley, or the like. In the present invention, the support rollers are "floating," meaning that such support rollers are not driven via a sprocket, pulley, or similar component, but instead are driven only by frictional force transferred from another moving component of the system, such as the steel belt.

A still further illustrative embodiment of the invention comprises:

(a) placing the steel in a steel heating furnace such that the steel is enveloped in a carbon monoxide atmosphere; and (b) oxidizing a portion of the carbon monoxide atmosphere, thereby generating heat and reheating the steel.

Another illustrative embodiment of the invention comprises:

(a) placing the steel in a steel heating furnace comprising
- a furnace housing for receiving steel thereinto, the furnace housing having sides and defining an interior furnace space;
- means for heating the interior furnace space and the steel residing within the furnace;
- support rollers rotatably disposed within the furnace housing for supporting steel thereupon;
- advancing means for advancing steel through the furnace housing without imparting a direct torsion driving force to the support rollers (b) heating the interior furnace space and the steel placed therein; and (c) advancing the steel through the furnace housing by imparting frictional driving force to the support rollers, which then impart frictional driving force to the steel.

Still another illustrative embodiment of the invention comprises:

(a) placing the steel in a steel heating furnace comprising:
a furnace housing for receiving steel thereinto, the furnace housing having sides and defining an interior furnace space;
means for heating the interior furnace space and the steel residing within the furnace;
support rollers rotatably disposed within the furnace housing for supporting steel thereupon; and
a hearth defining a floor of the interior furnace space configured for partially shielding the support rollers from heat contained in the interior furnace space;

(b) heating the interior furnace space and the steel placed therein; and (c) advancing the steel through the furnace housing by causing the support rollers to rotate, thereby imparting frictional driving force to the steel.

Additional objects and advantages of the invention will be set forth in the description that follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE SEVERAL VIEWS OF THE DRAWINGS

The above and other objects, features and advantages of the invention will become apparent from a consideration of the subsequent detailed description presented in connection with the accompanying drawings in which.

DETAILED DESCRIPTION

Figure 1:
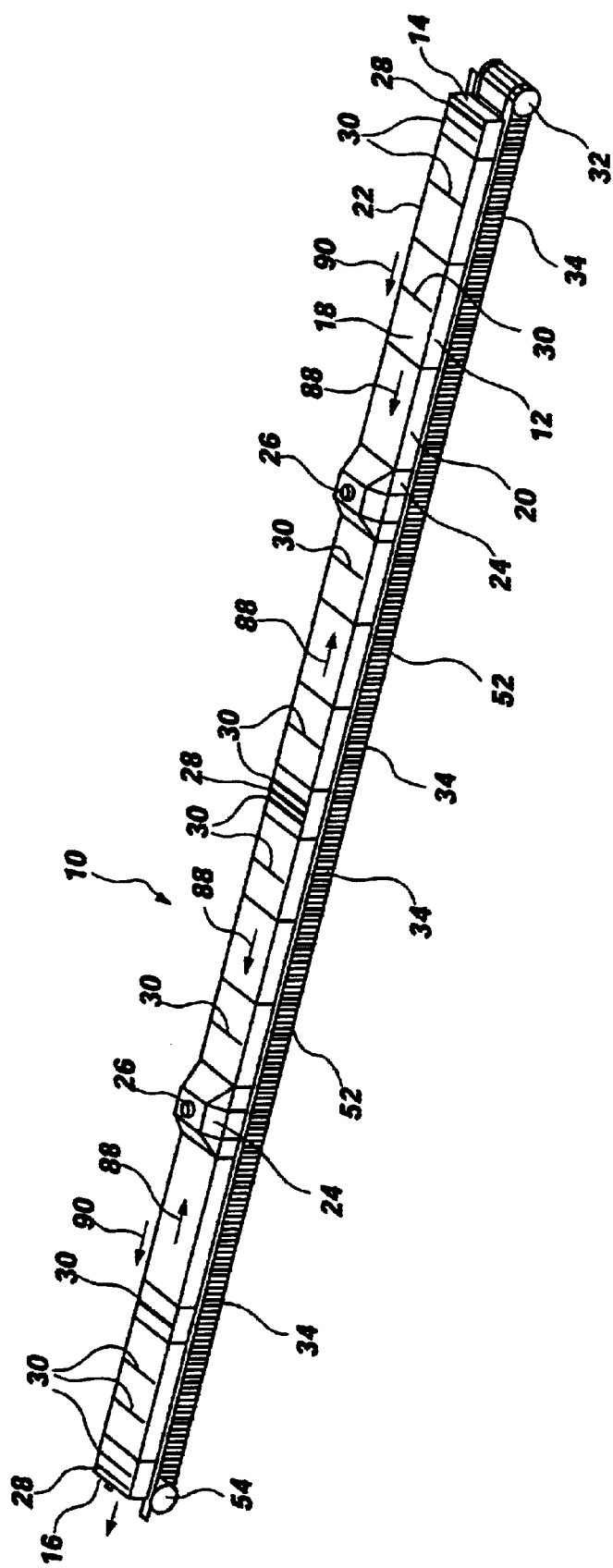
FIG. 1 shows a perspective view of a steel heating furnace according to the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Figure 2:
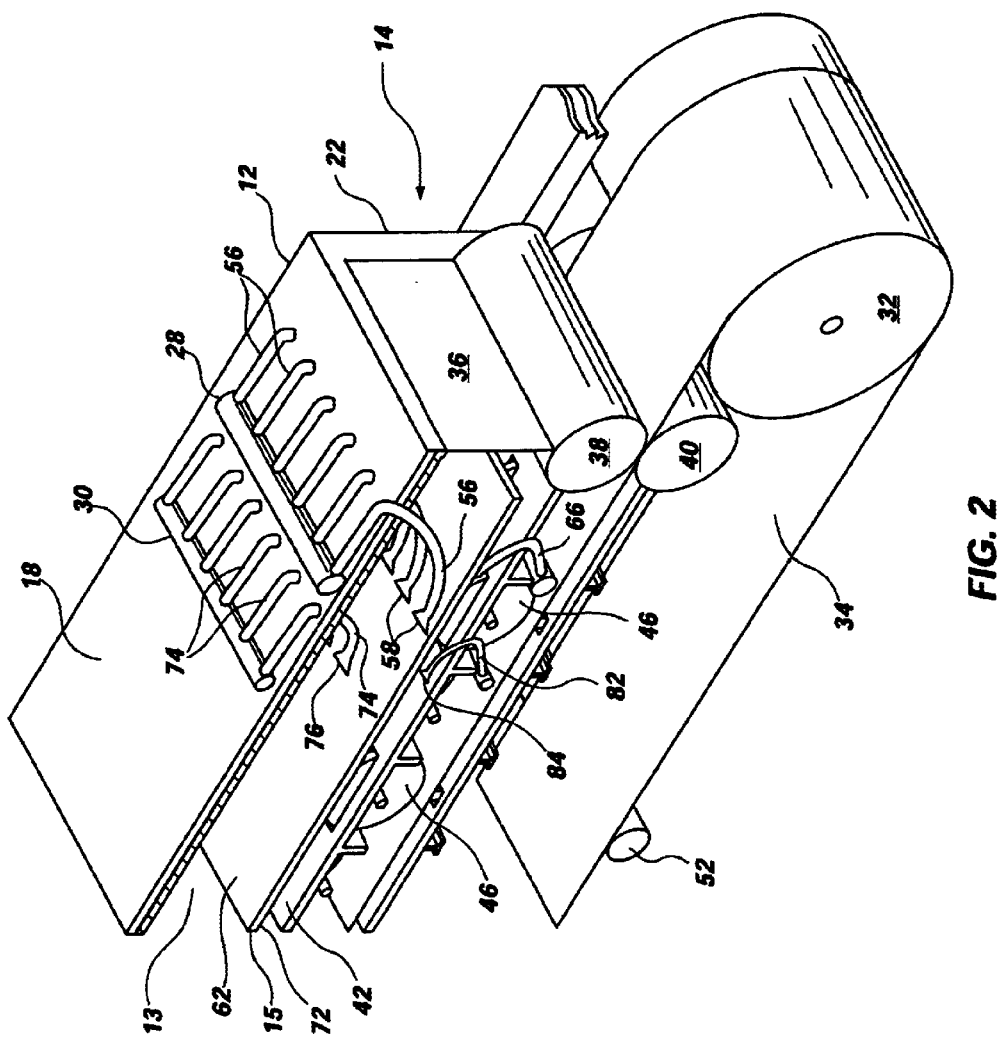
FIG. 2 shows a perspective, break-away view of a portion of the furnace of FIG. 1 proximal to the entrance opening.
Figure 3:
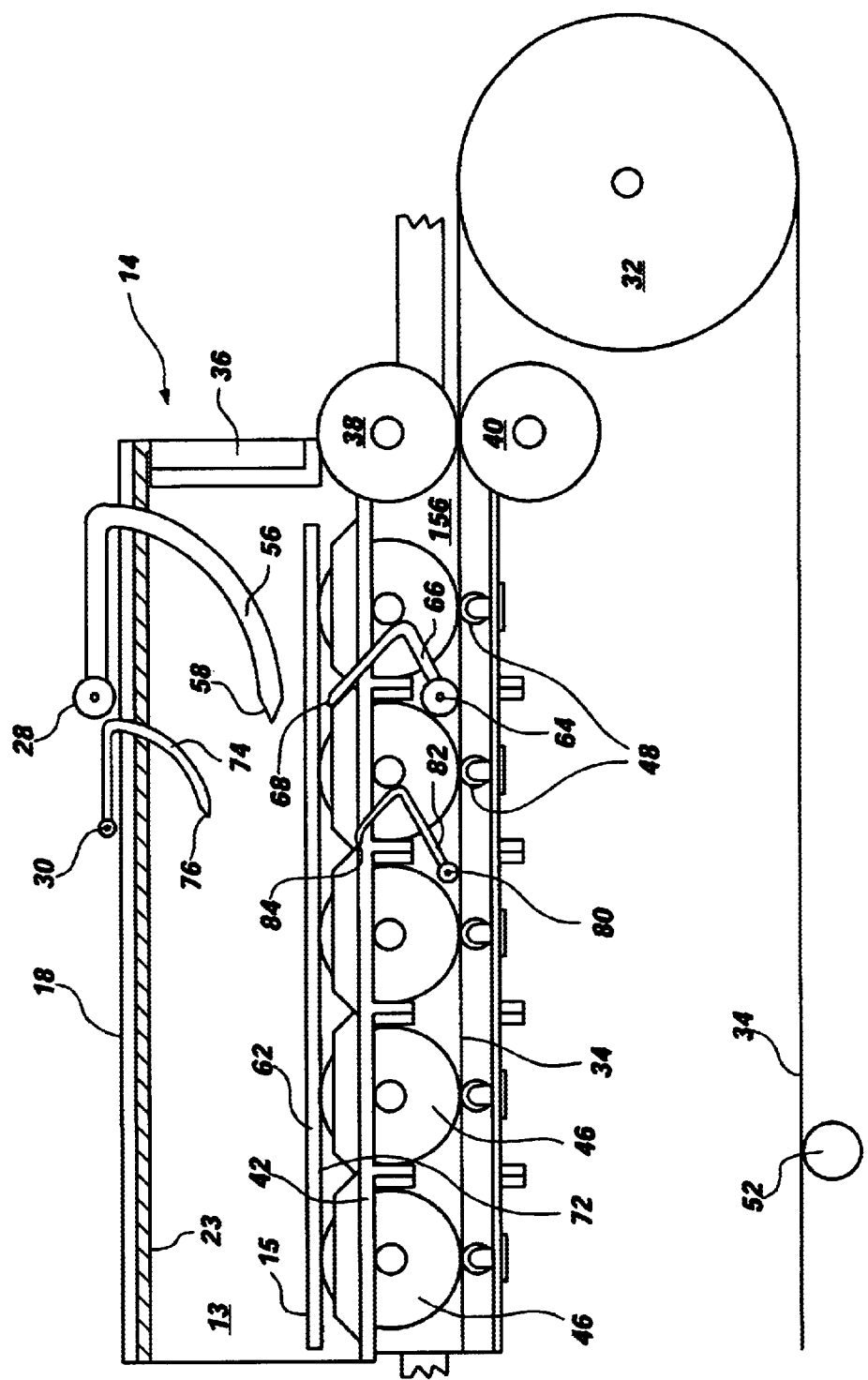
FIG. 3 shows a side sectional view of a portion of the furnace of FIG. 1 proximal to the entrance opening.

Referring now to FIGS. 1 and 2, there is shown an illustrative embodiment of the present invention. The steel heating furnace 10 comprises an elongate furnace housing 12 defining an interior space 13 into which steel slabs 15 to be reheated are received. The housing has an entrance opening 14 through which the steel slabs 15 enter the furnace 10, ranging from ambient temperature to about 815° C. (1500° F.), and an exit opening 16 through which the reheated steel slab 15 exits the furnace 10 at a temperature of 200–400° F. above the critical working temperature of 982° C. (1800° F.), and preferably at about 1204° C. (2200° F.). The housing comprises a top 18 and sides 20, 22 that assist in sealing the interior space of the furnace 10 from the exterior atmosphere. Preferably, the top and sides of the housing are removable at some points, such that waste materials from the interior of the furnace 10 can be removed easily, and also to facilitate maintenance of the furnace 10, when necessary. Preferably, the housing is well insulated to retain heat in the furnace 10, thereby assisting in making the reheating process more efficient. Insulation material 23 resides in the top 18 of the housing as illustrated in FIG. 3. Insulation material 23 is also placed in the sides 20, 22. Disposed in the top 18 is at least one furnace hood 24 for collecting gases and channeling them out of the furnace 10. A plurality of hoods 24 are preferably formed in the furnace 10 as shown. A flue 26 is disposed on each hood 24 for conducting these gases out of the furnace 10. This hood system reduces and preferably eliminates leakage of furnace gases into the environment. Also disposed in the top 18 is at least one carbon monoxide header 28 for conducting carbon monoxide into the interior space and at least one air header or oxygen header 30 for conducting preferably oxygen into the interior space. The header 30 may be referred to broadly in the claims as an air header, to signify that any suitable air mixture may be conveyed therethrough, although pure oxygen is preferred. These headers will be described in more detail below. Located below the entrance opening is a belt drum 32 for driving a continuous steel belt 34, for conducting the steel slabs 15 through the interior space 13. The belt drum is driven by a power drive, which can be of any conventional type. Located at the entrance opening 14 is a curtain 36, which hangs from the top 18 of the housing 12, to minimize exposure of the interior of the furnace 10 to atmosphere. A pair of sealing drums 38, 40 are also disposed at the entrance opening for working in cooperation with the curtain 36 for sealing the interior space of the furnace 10 from the exterior environment. The curtain 36 is flexible for permitting a steel slab to pass through the entrance opening 14. Once the steel slab 15 has entered the interior space of the furnace 10, the curtain hangs such that a bottom portion thereof contacts the sealing drum 38 for sealing the entrance opening. It will be apparent that the sealing drum 38 is disposed beneath the curtain 36 for this cooperative sealing of the entrance opening to occur. Sealing drums 38 and 40 are disposed such that their cylindrical axes are approximately horizontal, approximately parallel to each other, and generally vertically aligned. The steel belt 34 passes around the belt drum 32 and between sealing drums 38 and 40.

Figure 4:
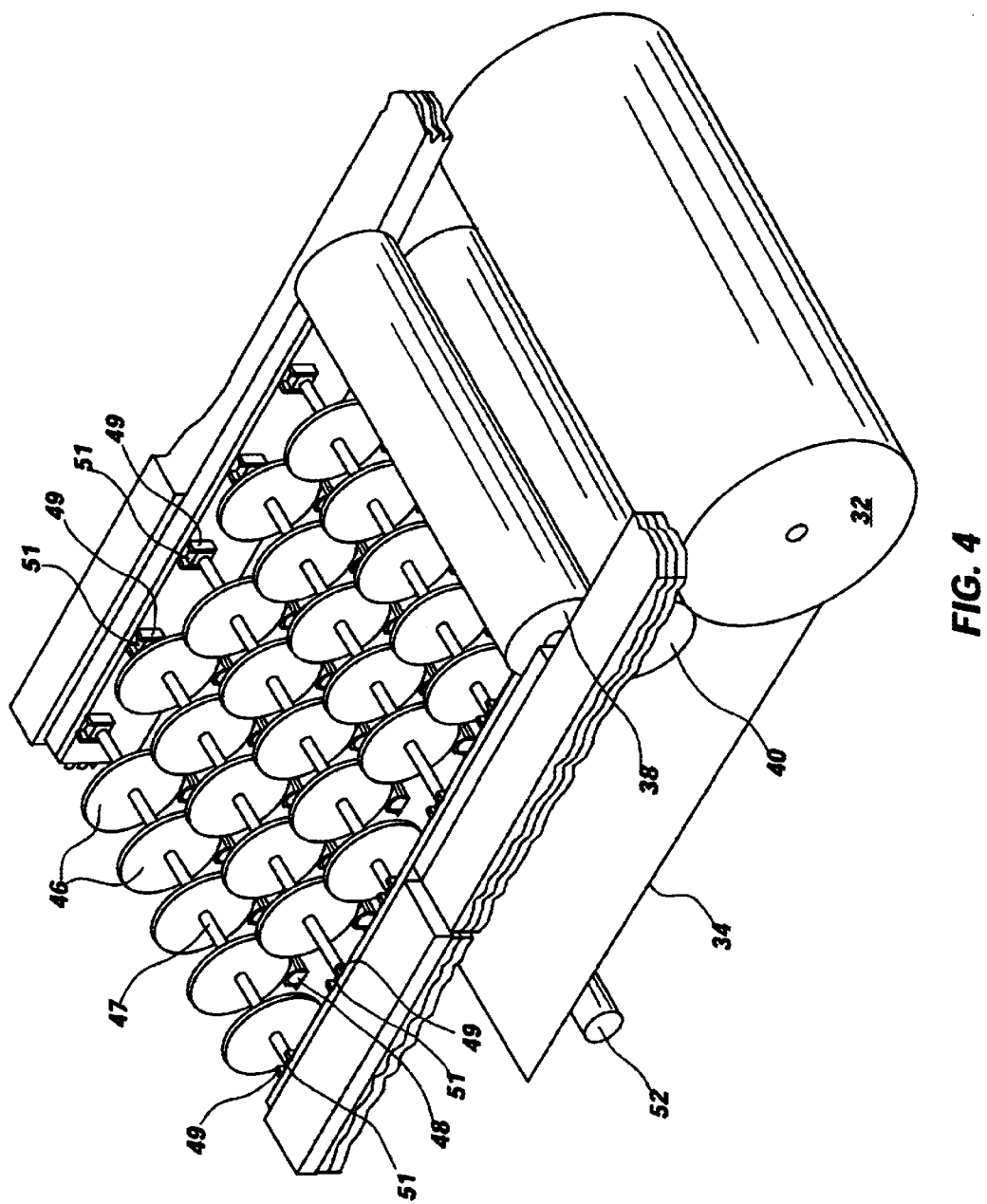
FIG. 4 shows another perspective cut-away view of a portion of the furnace of FIG. 1 proximal to the entrance opening, showing the belt drum, two sealing drums, and rollers mounted on axles.
Figure 5:
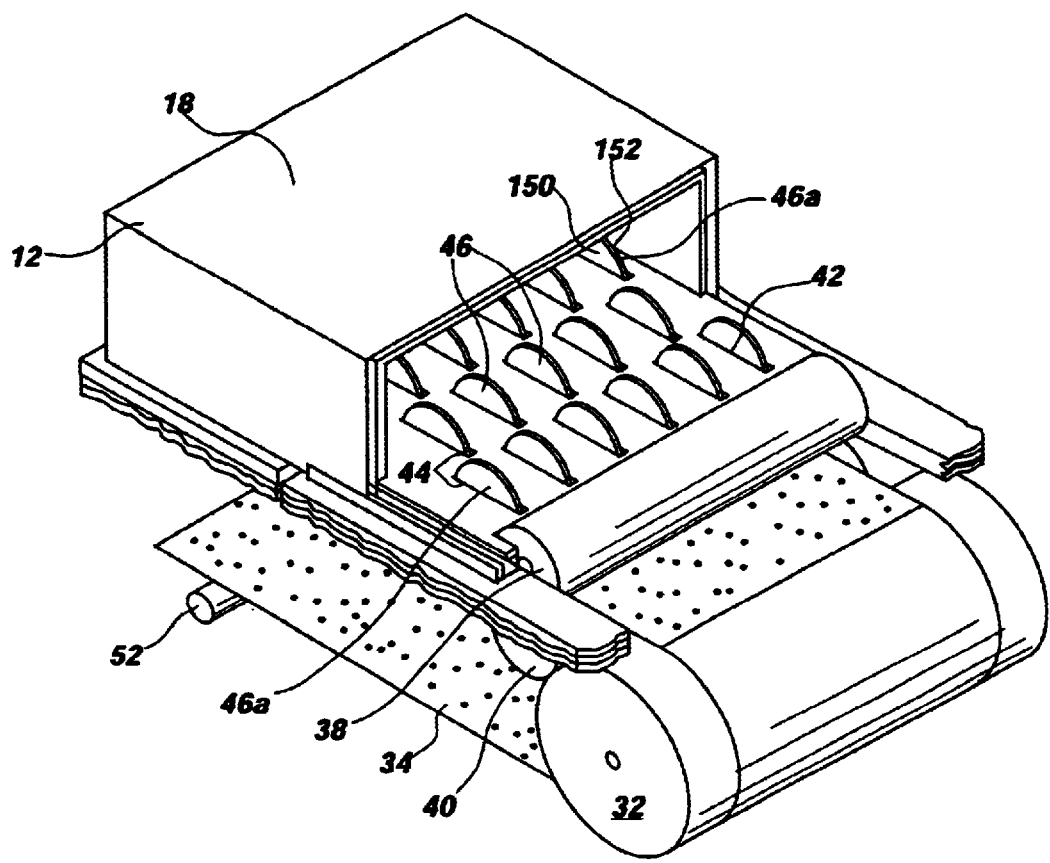
FIG. 5 shows another perspective cut-away view of the furnace of FIG. 1 showing the belt drum and belt, two sealing drums, rollers, roller heat shield, and axles.

Additional details of the furnace 10 are shown in FIGS. 3–5. The floor of the interior space 13 is provided by a heat-shield hearth 42, which comprises a generally planar member having slots 44 formed therein. Beneath the hearth is disposed a plurality of support rollers 46 mounted on axles 47 disposed generally perpendicularly to the direction of travel of the steel slab. The axles 47 are disposed on side supports 49, such that the axles 47 and rollers 46 are removably disposed within the furnace housing 12 for supporting the slab 15 thereupon, such that said rollers 46 are interchangeable. The axles 47 are preferably rotatably disposed in support blocks 51 and the ends of the axles 47, and the support block 51 is removably placed in the side supports 49.

Multiple support rollers 46 are disposed in a spaced-apart configuration on each axle 47. The support rollers protrude upward through the slots 44 in the heat-shield hearth 42. Thus, the instant furnace 10 is of the roller hearth type. The steel slab rests on these support rollers 46 as the slab is transported through the furnace 10. Beneath each support roller 46 is disposed a "back up roller," also referred to as a stabilizer roller 48 for providing support for the support roller 46, which in turn supports the weight of the steel slab. These stabilizer rollers 48 ultimately carry the load of the steel slab, eliminate warping of the support rollers 46, and maintain alignment of the hearth rolling plane. The belt 34 passes between the support rollers 46 and stabilizer rollers 48. The support rollers 46 rotate on the axles 47, and such rotation is preferably driven by friction between the support rollers 46 and the belt 34. That is to say that there is preferably no direct drive mechanism disposed on the support rollers for causing the support rollers to rotate.

The hearth helps to hold heat in the interior space and also tends to seal the bottom of the interior space for holding a controlled atmosphere in the interior space. The space beneath the hearth comprises a cool space 50 in which the axles, stabilizer rollers, and belt are disposed. The temperature in this cool space is lower than in the interior space of the furnace 10. Thus, the useful life of components that reside in the cool space is prolonged because of the lower temperature at which they operate in the cool space in comparison to the higher temperatures in the interior furnace space. Moreover, this shielding of the support rollers from the high temperatures of the interior space of the furnace 10 permits construction from less expensive heat resistant alloys, thereby reducing maintenance and construction costs. One or more belt rollers or idlers 52 may be disposed at selected locations beneath the return belt for supporting the belt and minimizing sagging thereof.

Referring again to FIG. 1, at the exit opening end of the furnace 10, there is another belt drum 54 around which the continuous belt 34 is disposed. Since it is desirable to seal the interior space for maintaining a controlled atmosphere therein, there is another curtain (not shown), similar to the curtain 36 located at the entrance opening, disposed at the exit opening for permitting the reheated steel slab to exit the furnace 10 while sealing the interior space of the furnace 10 at other times. This curtain is made of a flexible, heat resistant material. It will be appreciated that references to "substantially sealing the interior space of the furnace 10 from atmosphere" shall refer broadly to the concept of a furnace 10 that is sealed sufficient to retain a large amount of the sensible heat produced from the casting operation, permitting that heat to be utilized for metal rolling operations that occur after the reheating operation in the furnace 10.

There are also two sealing rollers, similar to the sealing rollers 38 and 40 at the entrance of the furnace 10, located at the exit of the furnace 10. In addition, there is an idler roller located at the exit of the furnace that corresponds with, and is similar to, the drive roller 32 at the entrance, and this exit idler roller shall preferably be fashioned such that it is moveable with respect to the belt 34, thus enabling the tension of the belt 34 to be adjusted.

As a partial summary, it will be appreciated that cast materials can flow directly and smoothly from a slab caster to the reheat furnace 10 without exposure to atmospheric cooling or oxidation, without the need for other equipment to accomplish this outcome, by utilizing the structural features described herein as may be appreciated by one of ordinary skill in the field. The furnace 10 may include a sealed shell, and the operation of the hoods 24 help prevent furnace gas leakage into the atmosphere. The furnace 10 is preferably constructed, in accordance with the above description, and accompanied by any further suitable structure sufficient to allow the flue gas to flow longitudinally within the furnace 10 with the steel slab 15. The rollers 46 are shielded by the heat-shield hearth 42 to minimize exposing the rollers 46 to the heat of the furnace 10, permitting the rollers 46 to be made from low cost heat resistant alloys, which further reduces maintenance and construction costs. The rollers 46 have less contact with the surface of the slab 15 than their prior counterparts (cylindrical rollers), thereby reducing heat transfer and eliminating cold areas in the slabs. The top and sides of the housing 12 are removable at some points, such that waste materials from the interior of the furnace 10 can be removed easily, and also to facilitate maintenance of the furnace 10, when necessary. Beneath each support roller 46 is disposed a stabilizer roller 48 for providing support for the support roller 46, which helps prevent the support roller axles from warping and maintains alignment of the hearth rolling plane. The furnace 10 preferably has the capability to adequately heat steel slab castings and also to reduce slab casting surface oxides to metallics to achieve excellence in surface malleability and ductility to thereby produce a highly smooth skin quality, utilizing any suitable structure and features for accomplishing the same as known to those having ordinary skill in the field.

Figure 6:
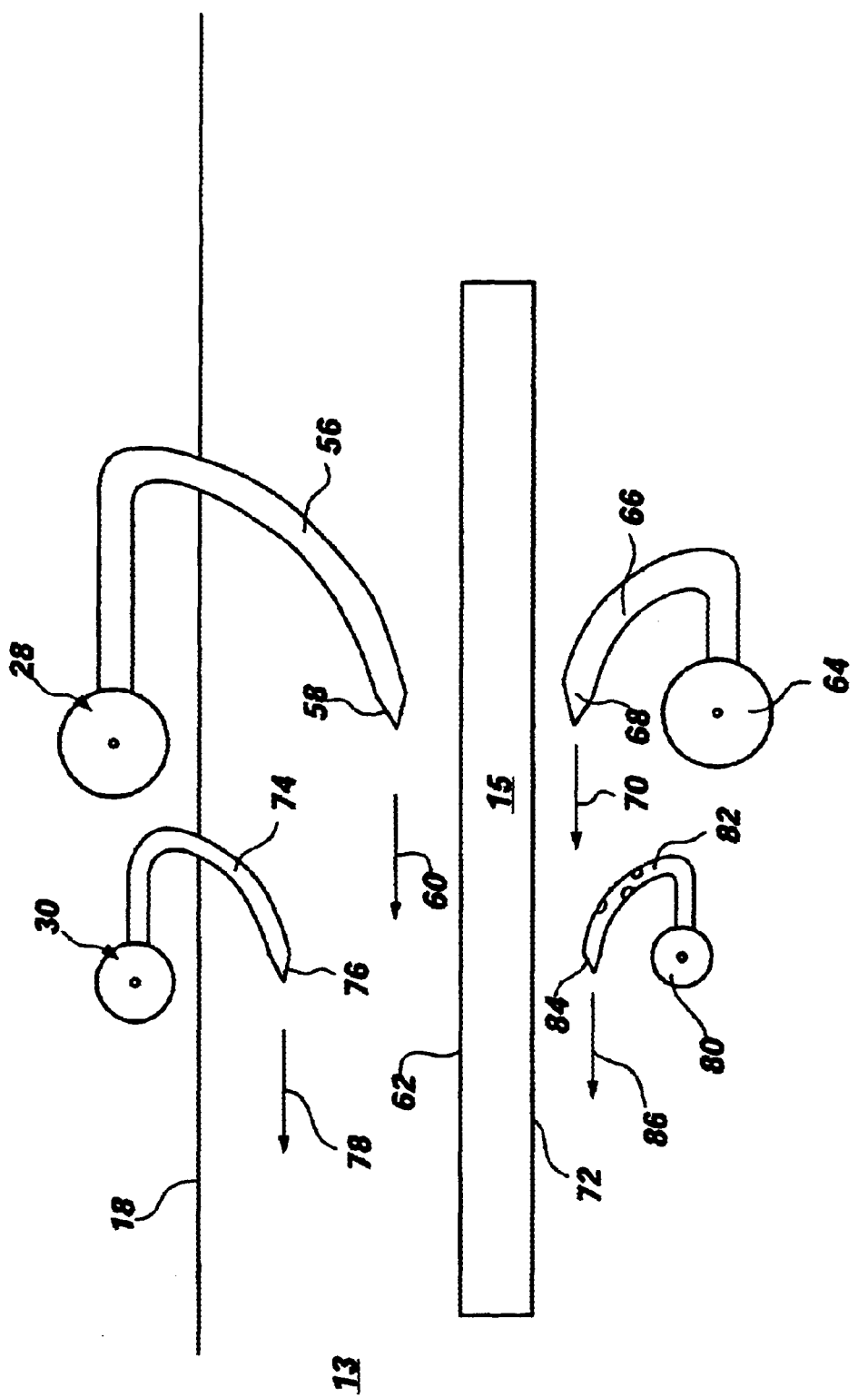
FIG. 6 shows a side view schematic diagram of the gas header systems used in connection with the furnace of FIG. 1.

FIG. 6 shows a side schematic view of illustrative apparatus for feeding gases into the interior space of the furnace 10 for controlling the atmosphere within the interior space. As described above, a carbon monoxide header 28 and an oxygen header 30 are disposed on the top 18 of the housing. The carbon monoxide header 28 comprises a pipe for conducting carbon monoxide gas into the interior space 13. The carbon monoxide header 28 further comprises a plurality of distribution pipes 56 spaced apart in a generally horizontal configuration and descending into the interior space 13. The distribution pipes 56 end in nozzles 58 for delivering carbon monoxide gas into the interior space. The carbon monoxide gas is preferably delivered in a direction, represented by arrow 60, parallel to the long axis of the slab 15 thereby forming a layer of carbon monoxide gas adjacent to the top surface 62 of the slab 15, and preferably in contact with the top surface 62 of the slab 15. A similar carbon monoxide header 64 with distribution pipes 66 and nozzles 68 is disposed below the slab 15 for distributing carbon monoxide gas in a direction, represented by arrow 70, parallel to the long axis of the slab 15, thereby forming a layer of carbon monoxide gas adjacent to the bottom surface 72 of the slab 15, and preferably in contact with the bottom surface 72 of the slab.

It is not required that all oxygen headers 30 reside amongst the carbon monoxide headers 28 as depicted in FIG. 6. For example, as shown in FIG. 1, it may be advantageous to construct several oxygen headers 30 in the heating furnace 10. The carbon monoxide headers 28 would operate to discharge a sufficient amount of carbon monoxide to maintain the slab 15 enveloped in carbon monoxide gas about its upper surface 62 and lower surface 72.

The oxygen header 30 also comprises a pipe for conducting oxygen into the interior space 13 of the furnace 10. The oxygen header 30 further comprises a plurality of distribution pipes 74 spaced apart in a generally horizontal configuration and descending into the interior space 13. The distribution pipes 74 end in nozzles 76 for delivering oxygen into the interior space. The oxygen is preferably delivered in a direction, represented by arrow 78, parallel to, or slightly inclined with respect to, the long axis of the slab 15, thereby forming a layer of oxygen adjacent to the layer of carbon monoxide. A similar oxygen header 80 with distribution pipes 82 and nozzles 84 is disposed below the slab 15 and belt 34 for distributing oxygen in a direction, represented by arrow 86, parallel to, or slightly inclined with respect to, the long axis of the slab 15, thereby forming a layer of oxygen adjacent to the layer of carbon monoxide gas.

The headers 28, 30, 64 and 80 are preferably rotatable, to thereby permit workers to selectively vary the injection angle, or inclination angle, formed by the nozzles 58, 68, 76 and 84 with respect to the steel slab 15. For example, it may be desirable to point the nozzles toward the steel slab 15, and this may be accomplished by turning some or all of the headers 28, 30, 64 and 80, accordingly.

As shown in FIG. 1, the carbon monoxide gas and oxygen delivered into the interior space of the furnace 10 travel in a direction, signified by arrows 88, parallel to the direction of travel of the slab 15 through the furnace 10, indicated by arrows 90. The carbon monoxide and oxygen enter the interior furnace space where they are injected through their respective headers 28 and 30, and are partially oxidized or combusted together in a combustion that is preferably initiated with a pilot light (not shown) as known to those of ordinary skill in the field. In operation, the combustion perpetuates itself because the carbon monoxide preferably has a temperature of 1100° F. when it is conveyed into the furnace 10 by the carbon monoxide headers 28, which temperature is higher than the kindling point of the combustion that occurs between carbon monoxide and oxygen. Accordingly, the carbon monoxide spontaneously combusts as it comes in contact with oxygen.

In the interior space, the carbon monoxide is oxidized according to the following reaction: $2\ CO+O_2\text{-}\ \text{-}\ \text{-}>2\ CO_2+135{,}000$ cal/mol. Any unoxidized carbon monoxide remains in the carbon monoxide layer next to the steel slab, thus shielding the steel slab from oxidation by superheated water vapor. The oxidation, or combustion, of the carbon monoxide in the interior space 13, and hence the temperature, is controlled by controlling the volume of oxygen conveyed into the furnace 10 by the oxygen headers 28. An amount of oxygen sufficient to combust part of the carbon monoxide is conveyed into the furnace 10 by the oxygen headers 30, to maintain the furnace temperature as desired, leaving the excess carbon monoxide enveloping the steel slab 15 to inhibit, and preferably prevent, the slab 15 from oxidizing by contact with water vapor or other oxidizing substance. The temperature within the furnace 10 can be increased at various points by increasing the amount of oxygen conveyed into the furnace 10.

The flue gases, including carbon monoxide and $CO_2$, travel parallel to the steel slab 15 and are removed from the furnace 10 through the hood 24 and flue 26. Preferably, these hot gases are channeled through a heat exchanger for preheating carbon monoxide and oxygen prior to their injection into the furnace 10. The preheated carbon monoxide and oxygen are injected into the interior furnace space, where the hot steel slab 15 provides sufficient heat to begin the oxidation reaction. This oxidation reaction burns carbon monoxide, yielding carbon dioxide and heat. The heat raises the temperature inside the furnace 10, and is transferred to the steel slab by convection and radiant pressure from the housing 12 and heat-shield hearth 42. This oxidation reaction is a nonluminous combustion reaction, which yields a higher temperature flue gas than is obtained with natural gas furnaces. Injection of additional carbon monoxide and oxygen into the furnace 10 perpetuates the oxidation reaction. Preferably, the temperature inside the furnace 10 may be varied in accordance with the temperature of the steel slabs 15 and the driving heat, in order to optimize the use of heat and more fully utilize the heat contained within the steel slabs 15. For example, the temperature inside the furnace 10 could be raised to 1427° C. (2600° F.) to heat the steel slabs 15 to about 1204° C. (2200° F.), but if the steel slabs 15 contained sufficient heat, the temperature inside the furnace 10 would not need to be raised as high in order bring the slabs 15 to the desired temperature.

The steel reheat furnace 10 is used in the steel making process as follows. Steel leaving the caster as large steel slabs at a temperature of about 815° C. (1500° F.) flows directly into the reheat furnace 10 of the present invention. This direct transfer of the steel slab 15 is preferably carried out without more than nominal cooling or oxidation of the steel slab 15 due to exposure to the atmosphere. Moreover, no special equipment is needed to handle the steel slab 15 since it preferably passes directly from the caster to the reheat furnace 10. This permits the retention of sensible heat from the casting and utilizes this energy for metal rolling reduction.

The steel slabs 15 enter the furnace 10 through the entrance opening 14 by displacing the curtain 36 and passing over the sealing drum 38 and then onto the support rollers 46 of the roller hearth 42. The support rollers 46 are caused to turn by the friction of the continuous steel belt 32. In turn, the friction of the turning support rollers 46 causes the steel slabs 15 to move toward the exit end of the furnace 10. The support rollers 46 have minimal contact with the steel slab 15 due to a relatively small surface area being in contact with the steel slabs 15, thus minimizing heat transfer from the steel slabs 15 to the support rollers 46 and eliminating formation of cold spots in the surface of the steel slabs 15. As the steel slabs 15 transit the furnace 10, it is enveloped in a carbon monoxide atmosphere formed by the layers of carbon monoxide gas adjacent to the steel slab 15 on both its top and bottom surfaces 62 and 72, respectively. This carbon monoxide atmosphere eliminates the formation of superheated water vapor, and thus inhibits, and preferably eliminates, the formation of iron oxide scale on the surface of the steel slab 15. At the same time, the carbon monoxide is oxidized as fuel for heating the furnace 10 to a preferred interior temperature of about 1427° C. (2600° F.) for heating the steel slab to about 1093° C. (2000° F.) throughout. Since steel is a relatively poor conductor of heat, transit time through the furnace 10 needs to be long enough for the entire steel slab 15 to reach a temperature of at least about 1093° C. (2000° F.). If surface and interior temperatures of the steel slab 15 are not somewhat uniform, the cross-sectional reduction of the slab 15 will not be uniform, and the gage of the rolled steel will vary, and the mechanical characteristics of the steel may vary during rolling, and the steel slab 15 may even tear. The heating of the steel slab 15 in the carbon monoxide atmosphere also reduces surface oxides produced during the slab casting process into metallics, thus achieving excellence in surface malleability and ductility and producing a butter smooth skin quality. Upon exiting the furnace 10, the reheated steel slab 15 passes through the curtain at the exit opening and can then go directly to the rolling stands for reduction rolling.

Figure 7:
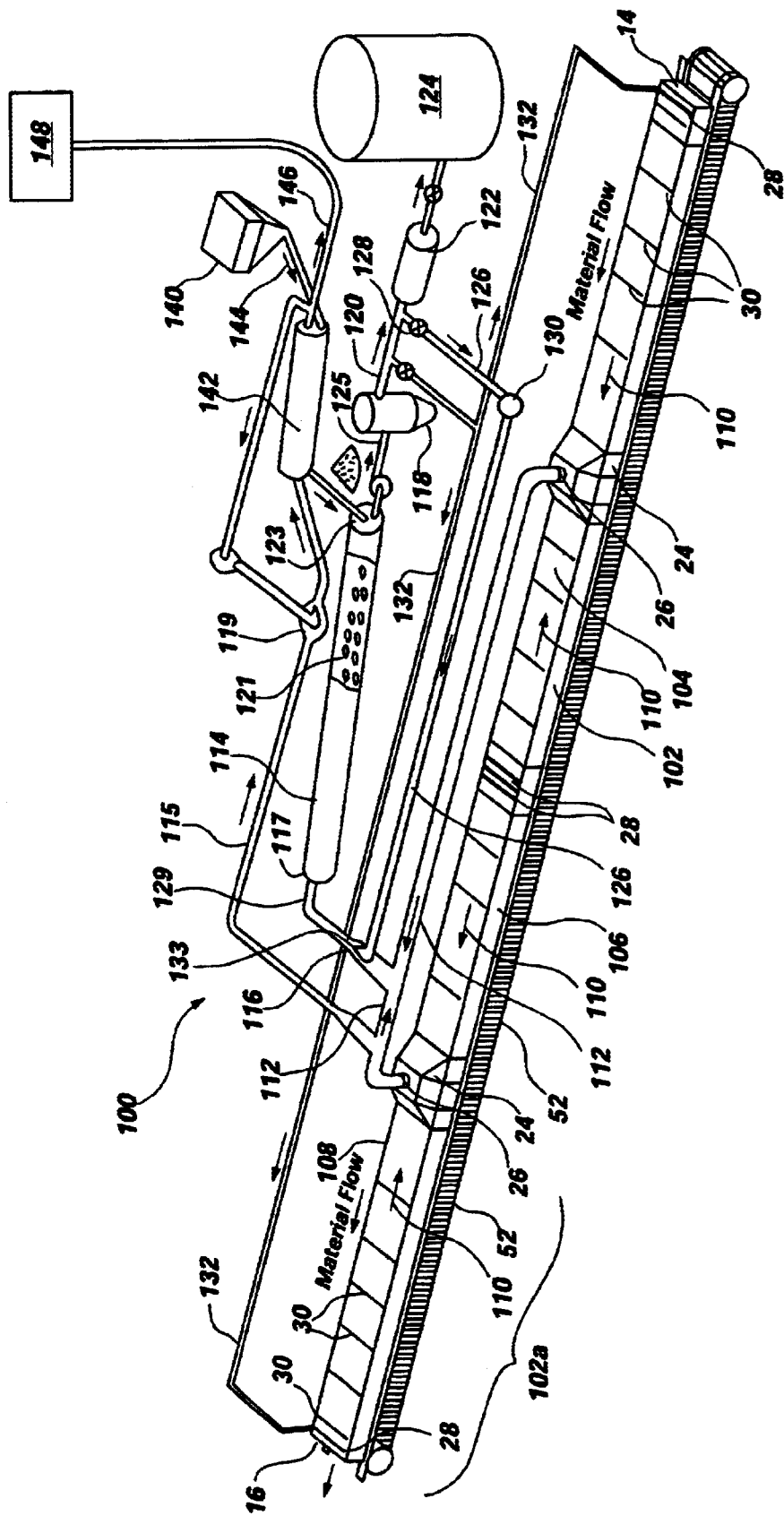
FIG. 7 shows a preferred embodiment of a steel heating furnace, made in accordance with the principles of the present invention, and which is an alternative embodiment to the steel heating furnace of FIG. 1.

Referring now to FIG. 7, there is shown an illustrative embodiment of a steel heating furnace 100, which includes features in addition to the those shown in conjunction with the furnace 10 of FIG. 1. It is to be understood that the internal workings of the furnace 10 of FIG. 1, as illustrated in FIGS. 2–6, are included as part of the steel heating furnace 100 of FIG. 7. Accordingly, all structures, features and methods illustrated in FIGS. 2–6 and described above apply equally to the furnace 10 of FIG. 1 and the furnace 100 of FIG. 7, and references to one of more of FIGS. 2–6 will be made below in conjunction with FIG. 7 accordingly.

The steel heating furnace 100 comprises an elongate furnace housing 102 defining an interior space 13 (see FIG. 2) into which a steel slab 15 (FIG. 2) to be reheated is received. The housing 102 has an entrance opening 14 through which the steel slab 15 enters the furnace, generally at a temperature of about 815° C. (1500° F.), and an exit opening 16 through which the reheated steel slab 15 exits the furnace 100 at a temperature of at least about 982° C. (1800° F.), and preferably at about 1093° C. (2000° F.). The housing 102 comprises a top 104 and sides 106, 108 that assist in sealing the interior space of the furnace 100 from the exterior atmosphere. Preferably, the top 104 and sides 106, 108 of the housing 102 are removable, such that waste materials from the interior of the furnace 100 can be removed easily, and also to facilitate maintenance of the furnace, when necessary. Preferably, the housing 102 is insulated to retain heat in the furnace 100, thereby assisting in making the reheating process more efficient. As illustrated in FIG. 3, the insulation material 23 in the top 18 and sides 20, 22 of the housing of furnace 10 of FIG. 1, are also present in the furnace 100 of FIG. 7.

In continued reference to FIG. 3, the at least one furnace hood 24 for collecting gases and channeling them out of the furnace 10 of FIG. 1 is also present in the furnace 100 of FIG. 7. A flue 26 is disposed on the hood 24 for conducting these gases out of the furnace. This hood system reduces and preferably eliminates leakage of furnace gases into the environment. Also disposed in the top 104 is at least one carbon monoxide header 28, and preferably several as shown, for conducting carbon monoxide into the interior space, and at least one oxygen header 30 (preferably several as shown) for conducting oxygen into the interior space. These headers operate as described above.

The furnace 100 of FIG. 7 is shown to include a system for regenerating carbon monoxide and engaging in destructive distillation of carbon sources, such as coal, to produce coke products. This system will now be described in conjunction with the embodiment of FIG. 7, in which the furnace gases preferably flow in opposing directions on either side of the flues 26 as shown by arrows 110. Oxygen and carbon monoxide are delivered directionally as shown by arrows 78 and 60, respectively, and by arrows 86 and 70, respectively, in FIG. 6, by which the gas flow directions 110 are directed toward the flues 26 as shown of FIG. 7. The gas flow directions 110 are assisted in part by a venturi passage 116 which produces a lower pressure immediately downstream from itself to thereby draw gas flow toward and through itself. The flue gases, which comprise excess carbon monoxide as well as the carbon dioxide by-product formed by the combustion of the carbon monoxide with oxygen, have a high temperature when they are discharged from the flue 26, preferably 2800° F.

The flue gases pass from the flue 26, and are divided to pass through flue gas conduits 112 and 119. Part of the flue gases are conveyed through the conduit 112 into a rotary kiln 114 containing a carbon source, such as coke that contains a carbon residue, and the remainder of the flue gases are conveyed through conduit 115 by venturi passage 119 into a destructive distillation chamber 142 as described below in more detail.

As those having ordinary skill will appreciate, the hot carbon dioxide portion of the flue gas is exposed to, and reacts with, the carbon reside of the coke in the kiln 114 to thereby regenerate a carbon monoxide by-product. The kiln 114 is preferably an inclined, rotational kiln, configured and arranged as known in the art to agitate and churn the coke 121 within the kiln 114 to thereby optimize the exposure and contact of the coke 121 with the hot carbon monoxide. As such, the unconsumed coke 121 that reaches the bottom of the rotary kiln 114 does not accumulate in an un-reacted state, but is rocked and churned such that it resides in exposure to the hot carbon dioxide. The rotary kiln 114 may be designed to include an internal conveyance means, or may be otherwise arranged, to cause the coke 121 that reaches the bottom of the kiln 114 to be conveyed back to the coke-entrance 123 thereof. The operation is preferably maintained such that an excess of carbon residue/coke resides in the rotary kiln 114 to thereby cause substantially all of the carbon dioxide portion of the flue gases to react with the carbon residue and become converted back into carbon monoxide as a useable by-product. It will be appreciated that the carbon monoxide has a much lower temperature when it is discharged into conduit 129 from the kiln 114, preferably 1100° F., than the 2800° F. temperature of the hot flue gases upon their entry into the kiln 114 at gas entry 117. This is due in part to the consumption of energy that is required to produce the reaction of the hot carbon dioxide with the carbon residue to produce carbon monoxide.

The useable carbon monoxide by-product passes from the kiln 114 through conduit 125 and through a particle separator 118 and into a conduit 120 from which the gases are divided and routed in several different directions. Some of the carbon monoxide passes through a steam boiler 122 and into a gas storage chamber 124 for future use as a utility fuel. The remainder of the carbon monoxide is either re-circulated along conduit 126 and back into the kiln 114 by cooperative operation of a valve 128 and gas blower 130, or is conveyed along conduit 132 and thereby re-routed back into the carbon monoxide headers 128 of the furnace 100.

The particle separator 118 operates to separate fly ash from the carbon monoxide passing through the conduit 125 from the kiln 114. It will be appreciated that high temperatures would cause the fly ash to melt. The problem is addressed in part by lowering the relatively higher 2800° F. temperature of the hot flue gases entering at 117, by combining those hot flue gases with the re-routed, lower-temperature (1100° F.) carbon monoxide that is conveyed into contact with the hot flue gases by the intersection of conduit 126 with conduit 112 at intersection point 133 which is the venturi passage 116. The mixture of these gases at their different temperature results in the gases having a temperature of perhaps 1700–1800° F. This temperature of 1700–1800° F., while quite hot, is still lower than the 2800° F. temperature of the hot flue gases, and as the temperature is lowered still further to the 1100° F. described above as a result of the reaction within the kiln 114, the fly ash is prevented from melting within the kiln 114 before it can be separated by particle separator 118.

It will also be appreciated that the volume of carbon monoxide gaseous fuel produced in the kiln 114 and discharged into conduit 125 is twice the volume of the carbon monoxide that is introduced into the furnace 100 at the carbon monoxide headers 28. That is the reason why roughly half of the carbon monoxide discharged into conduit 120 must be diverted through the boiler 122 and preferably into the gas storage chamber 124. This doubling in volume can be understood further by noting that the volume of gas flow into and out of the furnace housing 102 is relatively equivalent. The carbon monoxide that reacts with oxygen in the housing 102 to produce the useable carbon dioxide by-product gains double the oxygen as a result (2 $CO+O_2 \rightarrow 2\ CO_2$), and the useable carbon dioxide by-product in turn becomes fully reacted with the carbon contained in the kiln 114 such that twice the volume is carbon monoxide is produced ($2CO_2+2C \rightarrow 4CO$). Since all of the double-volume of oxygen, which intermediately forms a part of the carbon dioxide, is eventually converted to form carbon monoxide, the volume of regenerated carbon monoxide is naturally double the volume of carbon monoxide originally introduced into the carbon monoxide headers 28. This can be represented stoichiometrically as follows, in which reaction (1) below occurs within the furnace housing 102, and reaction (2) occurs within the rotary kiln 114:

the temperature of the slab 15, should any such oxidation occur. This carbon dioxide would mingle with the carbon dioxide formed by the combustion of carbon monoxide and oxygen within the furnace housing 102, and pass through the flues 26.

The steel slab 15 is fed through the entrance opening 14 and onto the tops of the support rollers 46. Side-support retaining rollers 46a are provided as outside support rollers on each shaft along either side of the movement path of the steel slabs 15. As shown most clearly in FIG. 5A, the side-support retaining rollers 46a each include a proximal face 150 that preferably has the same diameter as the support rollers 46. Also included is a frusto-conical retaining portion 152 which has a vertical thickness that is the same of the thickness of the drive belt 34. It can be seen and understood from the drawings that the side-support retaining rollers 46a, by being disposed in a substantial co-axial orientation with respect to the support rollers 46 in their respective rows, operate to prevent the steel slab 15 from deviating from a straight movement path through the furnace housing 102. The frusto-conical retaining portion 152 extends upwardly, by the thickness of the belt 34, higher than the bottom of the steel slab 15, thus operating to nudge the steel slab 15 gently sidewise and forward into position if the steel slab deviates into contact with the portion 152. The retaining rollers 46a are placed alongside the belt 34 and are supported in direct contact with stabilizer support rollers 48, which are uniform in size as shown, and no portion of the belt 34 resides therebetween.

$$\text{(oxidation)}\ 2CO + O_2 \rightarrow 2CO_2 \quad \frac{\text{Total calories produced}}{+135,200\ \text{calories per unit of}\ O_2} \quad (1)$$

$$\text{(reduction)}\ 2CO_2 + 2C \rightarrow 4CO \quad \frac{\text{Total calories recovered}}{-81,600\ \text{calories per unit of original}\ O_2\ \text{from reaction (1)}.} \quad (2)$$

$$\text{Total heat/energy produced:}\ \frac{\text{Total calories not recoverable}}{+53,600\ \text{calories per unit of original}\ O_2\ \text{from reaction (1)}.}$$

It is seen from the above that reaction (1) is exothermic, while reaction (2) is endothermic, and further, that the product of reaction (2), 4CO, is double the volume of the original carbon monoxide 2CO from reaction (1). Reaction (2) assumes that there is a sufficient amount of sensible energy in the $CO_2$ and CO to cause the carbon (C) contained within the kiln 114 to react with all of the carbon dioxide ($CO_2$) produced in reaction (1), in which case it is noted that the amount of the useable carbon monoxide by-product of reaction (2) would be twice the amount of carbon monoxide supplied originally as part of reaction (1) above. Of course, if a lesser amount of either sensible energy, or carbon (C), is supplied to the kiln 114, then the proportions represented above would be different, but it is preferred that an excess of carbon (C) reside in the kiln 114 to thereby cause all of the carbon dioxide ($CO_2$) to react within the kiln 114, as energy levels should be sufficient under the normal working conditions of the furnace 100.

It should be noted that although the carbon monoxide atmosphere maintained within the furnace housing 102 probably eliminates the formation of iron oxide surface scale on the steel slab 15, any iron oxide scale that does form from the reaction of the oxygen would react with the carbon monoxide atmosphere to product a small amount of carbon dioxide as well. Both the oxidation of the iron by oxygen, and the reduction of the iron oxide with the carbon monoxide to product carbon dioxide, product heat, thereby raising It is to be understood that, alternatively, conventional combustion could be utilized within the majority of the furnace housing 102, with the unique carbon monoxide atmosphere and combustion cycle reserved for perhaps the last section 102a of the furnace housing 102. The portion of the furnace 110 using carbon monoxide as a fuel would in such cases depend on the availability of a sufficient quantity of carbon monoxide. In such an embodiment, an abundant amount of iron oxide surface scale would by formed on the steel slab 15 during the conventional combustion phase, but the scale would react with the hot carbon monoxide in the final section 102a to thereby form carbon dioxide from the scale as described above, effectively converting the metal oxide back to a metallic state that would have ductile qualities giving the surface of the steel a smooth finish. This alternative could be utilized if an excess of carbon monoxide by-product was not available.

As shown in FIG. 7, the carbon source preferably originates from the coal contained in a coal bin 140. The coal passes from the bin 140 into the destructive distillation chamber 142 as shown by arrow 144. As those having ordinary skill in the relevant field will appreciate, coal contains volatiles. The high temperature carbon dioxide reacts with the advancing coal in the chamber 142 as part of the coking process, thereby converting the carbon dioxide to carbon monoxide. This carbon monoxide, along with the excessive amounts of un-combusted carbon monoxide that pass from the furnace 110 through the conduit 115, carry significant amounts of sensible heat, sufficient to remove the volatiles from the coal. The carbon dioxide that enters from conduit 115 into the destructive distillation chamber 142, reacts with the volatiles of the coal and drives them from the coal, to thereby produce coke as a by-product. It is possible that some carbon monoxide will be inadvertently produced in the destructive distillation chamber 142, but it is preferred that this be minimized, if not eliminated, by limiting the amount of carbon dioxide conveyed into said destructive distillation chamber 142.

It follows from the above that the carbon dioxide conveyed from the flues 26 through conduit 119 preferably remains at about 2800° F., or some high temperature, as it enters the destructive distillation chamber 142. The coal, when heated, also emits a heavy sulfur vapor, and the convection currents of the hot carbon dioxide and un-combusted carbon monoxide carry those sulfur vapors away from the coal and out of the chamber 142 through conduit 146 into a by-products area 148, along with the other volatiles. The by-products area 148 represents any suitable processing system, as known to those of ordinary skill in the field, for receiving and processing the by-products of coke manufacture and similar procedures, such by-products including, but not limited to, sulfur, ammonium sulfate, hydrogen, and light hydrocarbons (both the benzene and methane series).

Figure 8:
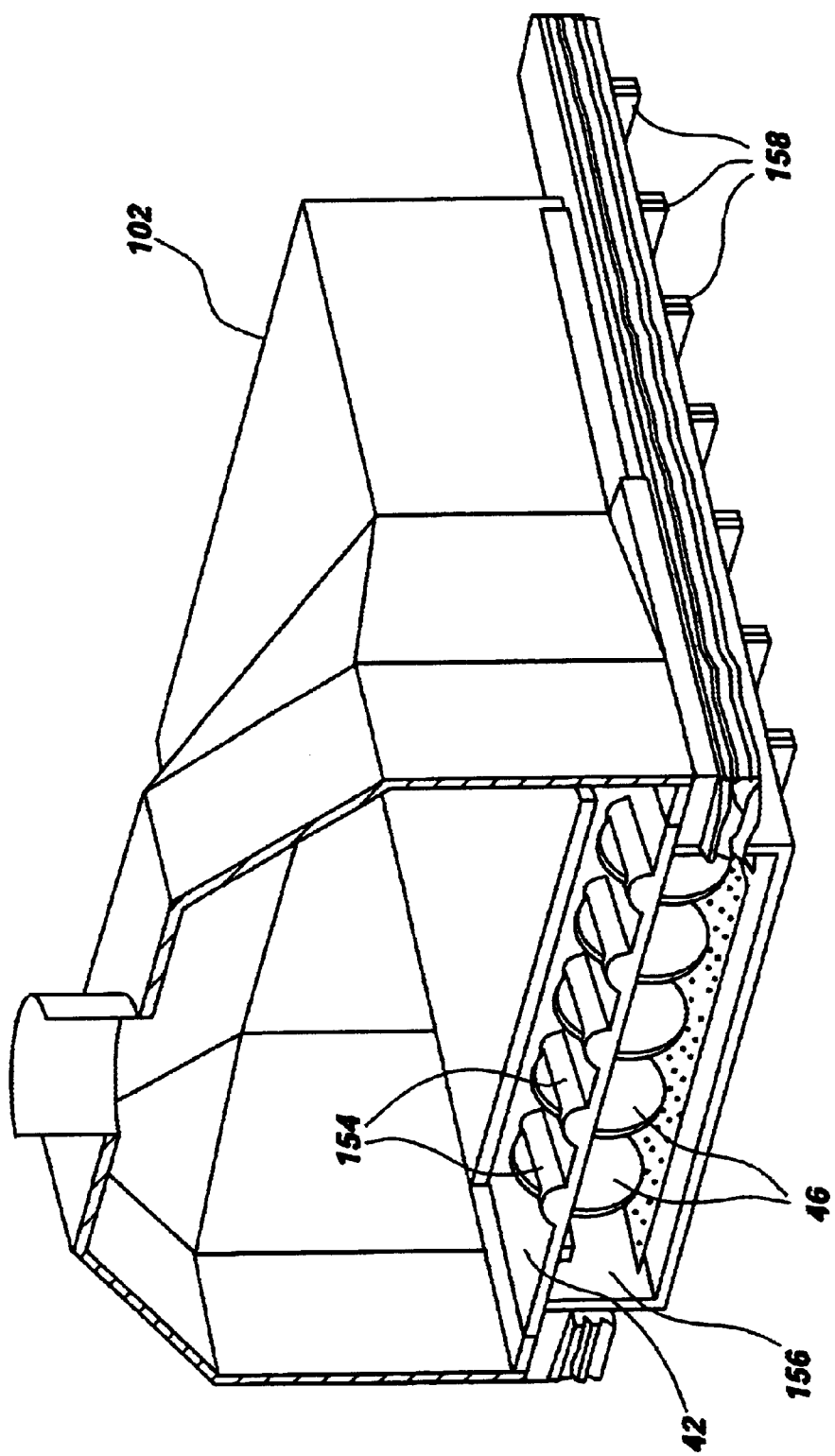
FIG. 8 shows an open view of an alternative embodiment of the furnace of FIG. 5, revealing support-roller refractories and a furnace housing at the flue-gas exhaust area.
Figure 9:
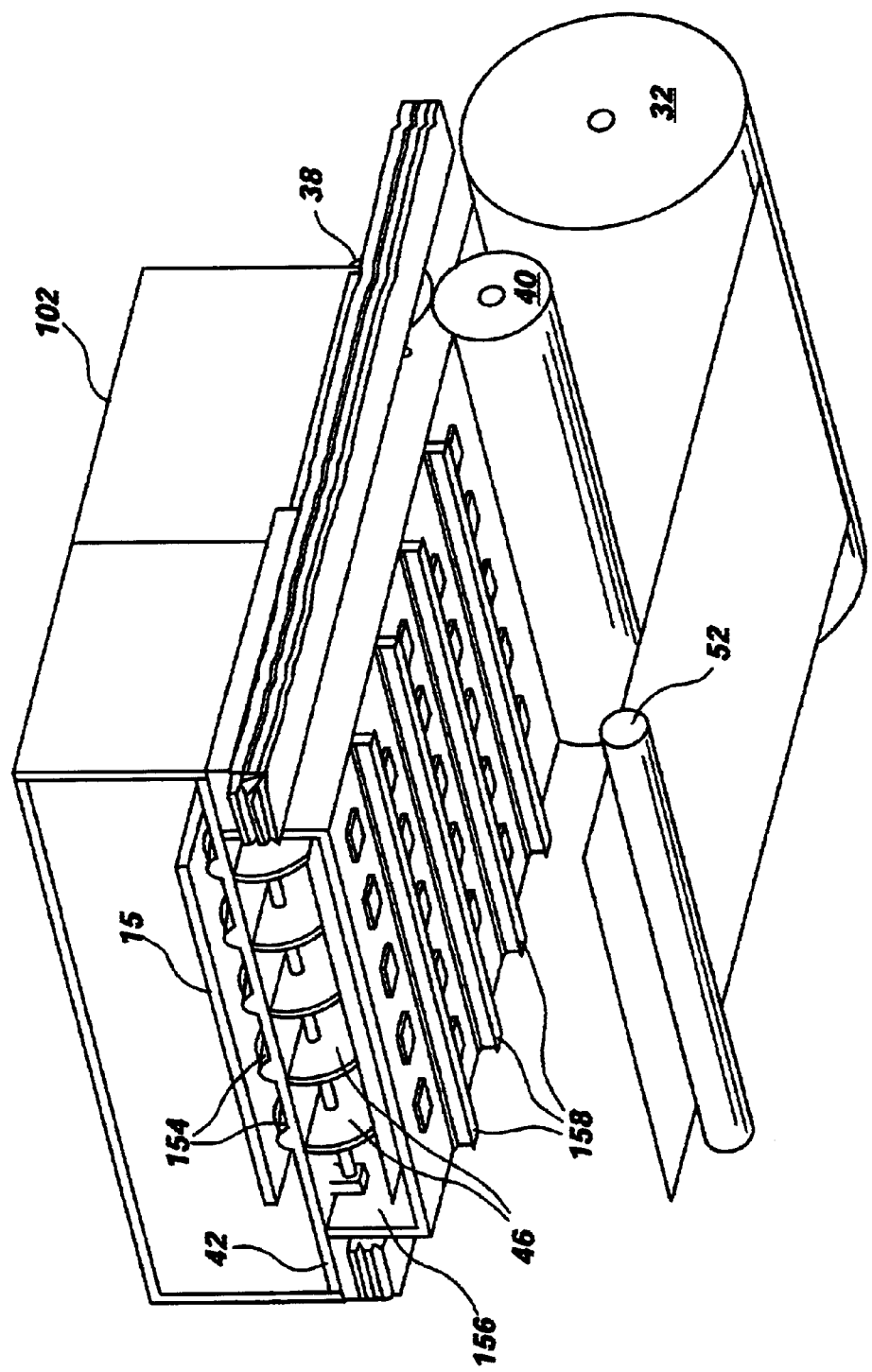
FIG. 9 is a perspective, under-side view of the furnace of FIG. 8.
Figure 5:
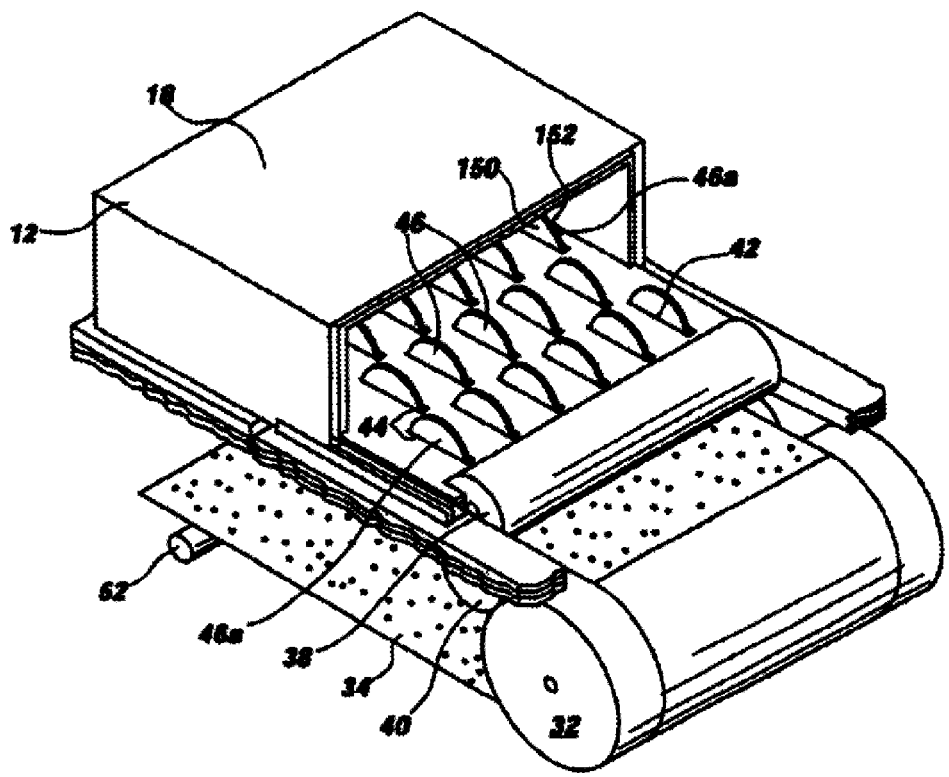
Figure 5A:
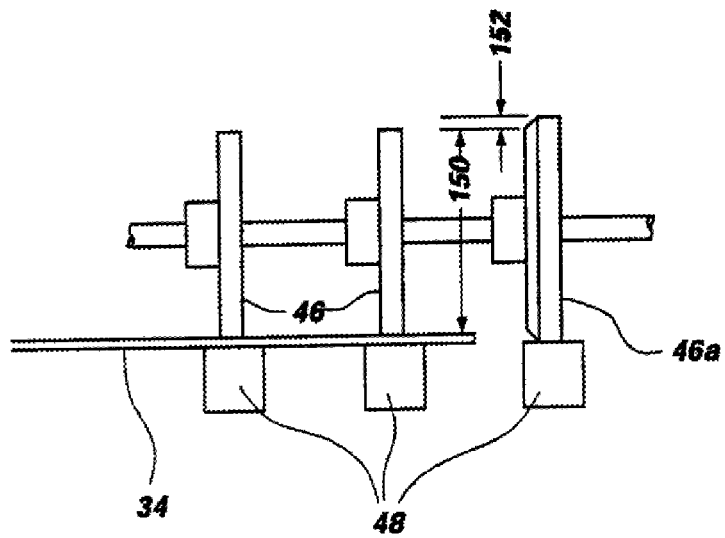

Referring now to FIGS. 8 and 9, there is shown a preferred alternative embodiment, in which upper portions of the support rollers 46 reside within protective covers 154. The covers 154 shield the upper portions of the support rollers 46 from the heat residing within the furnace housing 12 (FIGS. 1 and 5) or 102 (FIGS. 7 and 8–9).

The lower enclosed area 156 residing beneath the heat shield or hearth 42 is preferably maintained at a cooler temperature for several reasons that will be appreciated by those having ordinary skill in the field. This is accomplished by utilizing any suitable cooling means, such as water circulation means 158 for circulating cold water within the lower enclosed area 156.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A steel heating furnace, comprising:
   a furnace housing for receiving steel thereinto, said furnace housing defining an interior furnace space;
   means for heating the interior furnace space and the steel residing within the furnace;
   means for supplying carbon monoxide into the interior furnace space and maintaining a carbon monoxide atmosphere within said interior furnace space; and
   means for forming an oxygen layer on the carbon monoxide.

2. The furnace of claim 1 wherein said means for supplying carbon monoxide comprises a plurality of carbon monoxide headers, each comprising a plurality of distribution pipes ending with a nozzle, configured for enveloping the steel in carbon monoxide.

3. The furnace of claim 1 further comprising a plurality of air headers for supplying air into the interior furnace space, each of said plurality of air headers comprising a plurality of distribution pipes ending with a nozzle.

4. The furnace of claim 1 further comprising a hearth configured for defining a floor for the interior furnace space.

5. The furnace of claim 4 wherein the hearth comprises a plurality of slots formed therein wherein each of the plurality of slots is configured for receiving a support roller, and wherein the furnace further comprises a plurality of support rollers configured for being received in said plurality of slots such that the steel rides upon said plurality of support rollers.

6. The furnace of claim 5 wherein the plurality of support rollers is fully confined in said furnace housing.

7. The furnace of claim 1 wherein the interior furnace space is substantially sealed from the ambient atmosphere.

8. The furnace of claim 7 further comprising an entrance opening and an exit opening, each comprising a curtain for substantially sealing the interior furnace space from the ambient atmosphere.

9. The furnace of claim 1 wherein the housing comprises at least one furnace hood coupled to a flue for conducting furnace gases out of the furnace.

10. A steel heating furnace, comprising:
    a furnace housing for receiving steel thereinto, said furnace housing defining an interior furnace space;
    means for heating the interior furnace space and the steel residing within the furnace; and
    means for substantially sealing the furnace housing from atmosphere.

11. The furnace of claim 10 further comprising means for supplying carbon monoxide into the interior furnace space and maintaining a carbon monoxide atmosphere within said interior furnace space.

12. The furnace of claim 11 wherein said means for supplying carbon monoxide into the interior furnace space and maintaining a carbon monoxide atmosphere within said interior furnace space comprises a plurality of carbon monoxide headers, each comprising a plurality of distribution pipes ending with a nozzle, configured for enveloping the steel in carbon monoxide.

13. The furnace of claim 10 further comprising a plurality of air headers for supplying air into the interior furnace space, each of said plurality of air headers comprising a plurality of distribution pipes ending with a nozzle.

14. The furnace of claim 10 further comprising a hearth configured for defining a floor for the interior furnace space.

15. The furnace of claim 14 wherein the hearth comprises a plurality of slots formed therein wherein each of the plurality of slots is configured for receiving a support roller, and wherein the furnace further comprises a plurality of support rollers configured for being received in said plurality of slots such that the steel rides upon said plurality of support rollers.

16. The furnace of claim 15 wherein the plurality of support rollers is fully confined in said furnace housing.

17. The furnace of claim 10 wherein said means for substantially sealing the furnace housing from atmosphere comprises sides and a top, the furnace housing further comprising an entrance opening and an exit opening, each of said entrance opening and said exit opening comprising a curtain for substantially sealing the interior furnace space from the ambient atmosphere.

18. The furnace of claim 10 wherein the housing comprises at least one furnace hood coupled to a flue for conducting furnace gases out of the furnace.

19. A steel heating furnace, comprising:
a furnace housing for receiving steel thereinto, said furnace housing comprising sides, an entrance, and an exit opening, and wherein said furnace housing is sealed along its sides from atmosphere and defines an interior furnace space;
means for heating the interior furnace space and the steel residing within the furnace; and
means for blocking the entrance and the exit opening of the furnace housing from atmosphere, to inhibit the entry of ambient air into said furnace housing.

20. The furnace of claim 19 further comprising means for supplying carbon monoxide into the interior furnace space and maintaining a carbon monoxide atmosphere within said interior furnace space.

21. The furnace of claim 20 wherein said means for supplying carbon monoxide into the interior furnace space and maintaining a carbon monoxide atmosphere within said interior furnace space comprises a plurality of carbon monoxide headers, each comprising a plurality of distribution pipes ending with a nozzle, configured for enveloping the steel in carbon monoxide.

22. The furnace of claim 19 further comprising a plurality of air headers for supplying air into the interior furnace space, each of said plurality of air headers comprising a plurality of distribution pipes ending with a nozzle.

23. The furnace of claim 19 further comprising a hearth configured for defining a floor for the interior furnace space.

24. The furnace of claim 23 wherein the hearth comprises a plurality of slots formed therein wherein each of the plurality of slots is configured for receiving a support roller, and wherein the furnace further comprises a plurality of support rollers configured for being received in said plurality of slots such that the steel rides upon said plurality of support rollers.

25. The furnace of claim 24 wherein the plurality of support rollers is fully confined in said furnace housing.

26. The furnace of claim 19 wherein the housing comprises at least one furnace hood coupled to a flue for conducting furnace gases out of the furnace.

27. A steel heating furnace, comprising:
a furnace housing for receiving steel thereinto, said furnace housing having sides and defining an interior furnace space;
means for heating the interior furnace space and the steel residing within the furnace; and
rollers rotatably disposed within the furnace housing for supporting steel thereupon, wherein said rollers are fully confined within the furnace housing without extending beyond the sides of the furnace.

28. The furnace of claim 27 further comprising means for supplying carbon monoxide into the interior furnace space and maintaining a carbon monoxide atmosphere within said interior furnace space.

29. The furnace of claim 28 wherein said means for supplying carbon monoxide into the interior furnace space and maintaining a carbon monoxide atmosphere within said interior furnace space comprises a plurality of carbon monoxide headers, each comprising a plurality of distribution pipes ending with a nozzle, configured for enveloping the steel in carbon monoxide.

30. The furnace of claim 27 further comprising a plurality of air headers for supplying air into the interior furnace space, each of said plurality of air headers comprising a plurality of distribution pipes ending with a nozzle.

31. The furnace of claim 27 further comprising a hearth configured for defining a floor for the interior furnace space.

32. The furnace of claim 31 wherein the hearth comprises a plurality of slots formed therein wherein each of the plurality of slots is configured for receiving a roller.

33. The furnace of claim 27 wherein the interior furnace space is substantially sealed from the ambient atmosphere.

34. The furnace of claim 33 further comprising an entrance opening and an exit opening, each comprising a curtain for substantially sealing the interior furnace space from the ambient atmosphere.

35. The furnace of claim 27 wherein the housing comprises at least one furnace hood coupled to a flue for conducting furnace gases out of the furnace.

36. A steel heating furnace, comprising:
a furnace housing for receiving steel thereinto, said furnace housing defining an interior furnace space;
means for heating the interior furnace space and the steel residing within the furnace; and
a plurality of support roller means rotatably disposed within the furnace housing for supporting steel thereupon, wherein each support roller means comprises a series of spaced-apart, co-axial wheels.

37. The furnace of claim 36 further comprising means for supplying carbon monoxide into the interior furnace space and maintaining a carbon monoxide atmosphere within said interior furnace space.

38. The furnace of claim 37 wherein said means for supplying carbon monoxide into the interior furnace space and maintaining a carbon monoxide atmosphere within said interior furnace space comprises a plurality of carbon monoxide headers, each comprising a plurality of distribution pipes ending with a nozzle, configured for enveloping the steel in carbon monoxide.

39. The furnace of claim 36 further comprising a plurality of air headers for supplying air into the interior furnace space, each of said plurality of air headers comprising a plurality of distribution pipes ending with a nozzle.

40. The furnace of claim 36 further comprising a hearth configured for defining a floor for the interior furnace space.

41. The furnace of claim 40 wherein the hearth comprises a plurality of slots formed therein wherein each of the plurality of slots is configured for receiving one of said series of spaced-apart, co-axial wheels.

42. The furnace of claim 36 wherein the interior furnace space is substantially sealed from the ambient atmosphere.

43. The furnace of claim 42 further comprising an entrance opening and an exit opening, each comprising a curtain for substantially sealing the interior furnace space from the ambient atmosphere.

44. The furnace of claim 36 wherein the housing comprises at least one furnace hood coupled to a flue for conducting furnace gases out of the furnace.

45. A steel heating furnace, comprising:
a furnace housing for receiving steel thereinto, said furnace housing defining an interior furnace space;
means for heating the interior furnace space and the steel residing within the furnace;
a plurality of support roller means rotatably disposed within the furnace housing for supporting steel thereupon;
a plurality of stabilizer roller means disposed beneath, and in alignment with, the roller means, respectively.

46. The steel heating furnace of claim 45 wherein each support roller means comprises a series of spaced-apart, co-axial wheels, and wherein each stabilizer roller means also comprises a series of spaced-apart, co-axial wheels.

47. The steel heating furnace of claim 46 wherein the wheels of the stabilizer roller means are smaller in diameter than the wheels of the support roller means.

48. The steel heating furnace of claim 45 wherein axes of the stabilizer roller means are disposed in a slightly laterally offset orientation with respect to axes of the support roller means.

49. The steel heating furnace of claim 48 wherein the stabilizer roller means are disposed and positioned to support weight of the support roller means.

50. The steel heating furnace of claim 45 further comprising means for supplying carbon monoxide into the interior furnace space and maintaining a carbon monoxide atmosphere within said interior furnace space.

51. The steel heating furnace of claim 50 wherein said means for supplying carbon monoxide into the interior furnace space and maintaining a carbon monoxide atmosphere within said interior furnace space comprises a plurality of carbon monoxide headers, each comprising a plurality of distribution pipes ending with a nozzle, configured for enveloping the steel in carbon monoxide.

52. The steel heating furnace of claim 45 further comprising a plurality of air headers for supplying air into the interior furnace space, each of said plurality of air headers comprising a plurality of distribution pipes ending with a nozzle.

53. The steel heating furnace of claim 45 further comprising a hearth configured for defining a floor for the interior furnace space.

54. The steel heating furnace of claim 53 wherein the hearth comprises a plurality of slots formed therein wherein the plurality of slots is configured for receiving the support roller means.

55. The steel heating furnace of claim 45 wherein the interior furnace space is substantially sealed from the ambient atmosphere.

56. The steel heating furnace of claim 55 further comprising an entrance opening and an exit opening, each comprising a curtain for substantially sealing the interior furnace space from the ambient atmosphere.

57. The steel heating furnace of claim 45 wherein the housing comprises at least one furnace hood coupled to a flue for conducting furnace gases out of the furnace.

58. A steel heating furnace, comprising:
   a furnace housing for receiving steel thereinto, said furnace housing having sides and defining an interior furnace space;
   means for heating the interior furnace space and the steel residing within the furnace; and
   support rollers rotatably and removably disposed within the furnace housing for supporting steel thereupon, such that said rollers are interchangeable.

59. The furnace of claim 58 further comprising means for supplying carbon monoxide into the interior furnace space and maintaining a carbon monoxide atmosphere within said interior furnace space.

60. The furnace of claim 59 wherein said means for supplying carbon monoxide into the interior furnace space and maintaining a carbon monoxide atmosphere within said interior furnace space comprises a plurality of carbon monoxide headers, each comprising a plurality of distribution pipes ending with a nozzle, configured for enveloping the steel in carbon monoxide.

61. The furnace of claim 58 further comprising a plurality of air headers for supplying air into the interior furnace space, each of said plurality of air headers comprising a plurality of distribution pipes ending with a nozzle.

62. The furnace of claim 58 further comprising a hearth configured for defining a floor for the interior furnace space.

63. The furnace of claim 62 wherein the hearth comprises a plurality of slots formed therein wherein each of the plurality of slots is configured for receiving one of said support rollers.

64. The furnace of claim 58 wherein said support rollers are fully confined in said furnace housing.

65. The furnace of claim 58 wherein the interior furnace space is substantially sealed from the ambient atmosphere.

66. The furnace of claim 65 further comprising an entrance opening and an exit opening, each comprising a curtain for substantially sealing the interior furnace space from the ambient atmosphere.

67. The furnace of claim 58 wherein the housing comprises at least one furnace hood coupled to a flue for conducting furnace gases out of the furnace.

68. A steel heating furnace, comprising:
   a furnace housing for receiving steel thereinto, said furnace housing having sides and defining an interior furnace space;
   means for heating the interior furnace space and the steel residing within the furnace;
   support rollers rotatably disposed within the furnace housing for supporting steel thereupon; and
   advancing means for advancing steel through the furnace housing without imparting a direct torsion driving force to the support rollers.

69. The furnace of claim 68 further comprising means for supplying carbon monoxide into the interior furnace space and maintaining a carbon monoxide atmosphere within said interior furnace space.

70. The furnace of claim 69 wherein said means for supplying carbon monoxide into the interior furnace space and maintaining a carbon monoxide atmosphere within said interior furnace space comprises a plurality of carbon monoxide headers, each comprising a plurality of distribution pipes ending with a nozzle, configured for enveloping the steel in carbon monoxide.

71. The furnace of claim 68 further comprising a plurality of air headers for supplying air into the interior furnace space, each of said plurality of air headers comprising a plurality of distribution pipes ending with a nozzle.

72. The furnace of claim 68 further comprising a hearth configured for defining a floor for the interior furnace space.

73. The furnace of claim 72 wherein the hearth comprises a plurality of slots formed therein wherein each of the plurality of slots is configured for receiving one of said support rollers.

74. The furnace of claim 68 wherein the support rollers are fully confined in said furnace housing.

75. The furnace of claim 68 wherein the interior furnace space is substantially sealed from the ambient atmosphere.

76. The furnace of claim 75 further comprising an entrance opening and an exit opening, each comprising a curtain for substantially sealing the interior furnace space from the ambient atmosphere.

77. The furnace of claim 68 wherein the housing comprises at least one furnace hood coupled to a flue for conducting furnace gases out of the furnace.

78. A steel heating furnace comprising:
   a furnace housing for receiving steel thereinto, said furnace housing having sides and defining an interior furnace space;

means for heating the interior furnace space and the steel residing within the furnace;

support rollers rotatably disposed within the furnace housing for supporting steel thereupon; and a hearth defining a floor of the interior furnace space configured for partially shielding the support rollers from heat contained in the interior furnace space.

79. The furnace of claim 78 wherein the hearth comprises a plurality of slots formed therein wherein each of the plurality of slots is configured for receiving one of said support rollers.

80. A steel heating furnace, comprising:

a furnace housing for receiving steel thereinto, said furnace housing defining an interior furnace space;

means for heating the interior furnace space and the steel residing within the furnace;

means for supplying carbon monoxide into the interior furnace space and forming and maintaining a carbon monoxide layer adjacent to and surrounding the steel; and means for supplying air into the interior furnace space and forming and maintaining an air layer surrounding at least a portion of the carbon monoxide layer.

81. The furnace of claim 80 wherein said means for supplying carbon monoxide comprises a plurality of carbon monoxide headers, each comprising a plurality of distribution pipes ending with a nozzle.

82. The furnace of claim 80 wherein said means for supplying air comprises a plurality of air headers, each comprising a plurality of distribution pipes ending with a nozzle.

83. A steel heating furnace comprising:

a furnace housing f or receiving steel thereinto, said furnace housing defining an interior furnace space and having a removable top and sides suitable for permitting removal of waste materials from the interior furnace space;

means for heating the interior furnace space and the steel residing within the furnace; and an entrance opening and an exit opening and means for transporting the steel from the entrance opening through the exit opening.

84. A steel heating furnace, comprising:

a furnace housing for receiving steel thereinto, said furnace housing defining an interior furnace space;

means for heating the interior furnace space and the steel residing within the furnace;

a plurality of support rollers rotatably disposed within the furnace housing for supporting steel thereupon; and at least one stabilizer roller disposed beneath and in alignment with each of said plurality of support rollers for supporting and stabilizing said plurality of support rollers.

85. The steel heating furnace of claim 84 wherein each of said plurality of support rollers comprises a series of spaced-apart, co-axial wheels, and wherein each of said at least one stabilizer roller also comprises a series of spaced-apart, co-axial wheels.

86. The steel heating furnace of claim 85 wherein the wheels of the at least one stabilizer roller are smaller in diameter than the wheels of the plurality of support rollers.

87. The steel heating furnace of claim 84 wherein axes of the at least one stabilizer rollers are disposed in a slightly laterally offset orientation with respect to axes of the plurality of support rollers.

88. A steel heating furnace, comprising:

a furnace housing for receiving steel thereinto, said furnace housing being substantially sealed from the ambient environment and defining an interior furnace space, said furnace housing having a removable top and sides suitable for permitting removal of waste materials from the interior furnace space and comprising at least one furnace hood coupled to a flue for conducting furnace gases out of the furnace;

means for heating the interior furnace space and the steel residing within the furnace;

a plurality of carbon monoxide headers, each comprising a plurality of distribution pipes ending with a nozzle, for supplying carbon monoxide into the interior furnace space and forming and maintaining a carbon monoxide layer adjacent to and surrounding the steel;

a plurality of air headers, each comprising a plurality of distribution pipes ending with a nozzle, for supplying air into the interior furnace space and forming and maintaining an air layer surrounding the carbon monoxide layer;

a hearth configured for defining a floor for the interior furnace space, comprising a plurality of slots formed therein and configured for receiving support rollers and for partially shielding such support rollers from heat contained in the interior furnace space, and wherein the furnace further comprises a plurality of support rollers rotatably and removably disposed within the furnace housing for supporting steel thereupon such that said rollers are interchangeable, said support rollers comprising a series of spaced-apart, co-axial wheels, fully confined in said furnace housing and configured for being received in said plurality of slots such that the steel rides upon said plurality of support rollers;

a plurality of stabilizer rollers disposed beneath and in alignment with the support rollers, wherein each of said plurality of stabilizer rollers also comprises a series of spaced-apart co-axial wheels, and further wherein the stabilizer rollers are smaller in diameter than the wheels of the support rollers, axes of the stabilizer roller means are disposed in a slightly laterally offset orientation with respect to axes of the support rollers, and the stabilizer rollers are disposed and positioned to support weight of the support rollers;

an entrance opening and an exit opening, each comprising a curtain for substantially sealing the interior furnace space from the ambient atmosphere; and advancing means for advancing steel through the furnace housing without imparting a direct torsion driving force to the support rollers.

89. The furnace of claim 28, further comprises cooling means for reducing a temperature of space residing beneath the hearth.

90. The furnace of claim 89, wherein the cooling means comprises means for circulating a liquid along a movement path residing beneath the hearth.

91. The furnace of claim 5, further comprises roller cover means for shielding upper portions of the support rollers from heat residing within the furnace.

92. The furnace of claim 91, wherein the roller cover means further comprises cover members having slots formed in uppermost portions thereof to permit the support rollers to protrude from said slots.

93. The furnace of claim 1, wherein the means for supplying carbon monoxide further comprises a header disposed on the furnace housing.

94. A steel heating furnace, comprising:
- a furnace housing for receiving steel thereinto, said furnace housing defining an interior furnace space;
- means for heating the interior furnace space and the steel residing within the furnace; and
- means for supplying carbon monoxide into the interior furnace space and maintaining a carbon monoxide atmosphere within said interior furnace space;
- wherein the means for supplying carbon monoxide further comprises a header disposed on the furnace housing; and
- wherein the header further comprises a discharge opening and moving means for moving said discharge opening of said header to thereby vary a position of said discharge opening.

95. The furnace of claim 94, wherein the moving means further comprises means for moving the header to thereby orient the discharge opening toward the steel.

96. The furnace of claim 1, further comprising:
- means for supplying oxygen into the interior furnace space.

97. A steel heating furnace, comprising:
- a furnace housing for receiving steel thereinto, said furnace housing defining an interior furnace space;
- means for heating the interior furnace space and the steel residing within the furnace;
- means for supplying carbon monoxide into the interior furnace space and maintaining a carbon monoxide atmosphere within said interior furnace space; and
- means for supplying oxygen into the interior furnace space;
- wherein the means for supplying oxygen further comprises an oxygen header disposed on the furnace housing, and wherein the oxygen header further comprises a discharge opening and moving means for moving said discharge opening of said oxygen header to thereby vary a position of said discharge opening, and wherein the moving means further comprises means for moving the oxygen header to thereby orient the discharge opening toward the steel.

98. A steel heating furnace, comprising:
- a furnace housing for receiving steel thereinto, said furnace housing defining an interior furnace space;
- means for heating the interior furnace space and the steel residing within the furnace; and
- means for supplying carbon monoxide into the interior furnace space and maintaining a carbon monoxide atmosphere within said interior furnace space;
- wherein the means for heating the interior furnace space utilizes carbon monoxide and oxygen as fuel for producing heat.

99. The furnace of claim 1 wherein the means for forming an oxygen layer is configured for forming a layer of oxygen both above and below the steel.

100. The furnace of claim 1 wherein the means for supplying carbon monoxide is configured to deliver carbon monoxide in a layer on the steel in a direction substantially parallel to a long axis of the steel.

101. The furnace of claim 10 wherein the means for substantially sealing the furnace housing from atmosphere comprises a flexible curtain.

102. The furnace of claim 27 wherein the rollers are supported on axles, and wherein said axles are fully confined within the furnace housing without extending beyond the sides of the furnace.

103. The furnace of claim 36 further comprising a continuous belt for driving said support roller means.

104. The furnace of claim 58 wherein the support rollers are supported on support blocks, said support blocks being removably placed in side supports.

* * * * *

UNITED STATES PATENT AND TRADEMARK OFFICE
CERTIFICATE OF CORRECTION

Figure 5A:
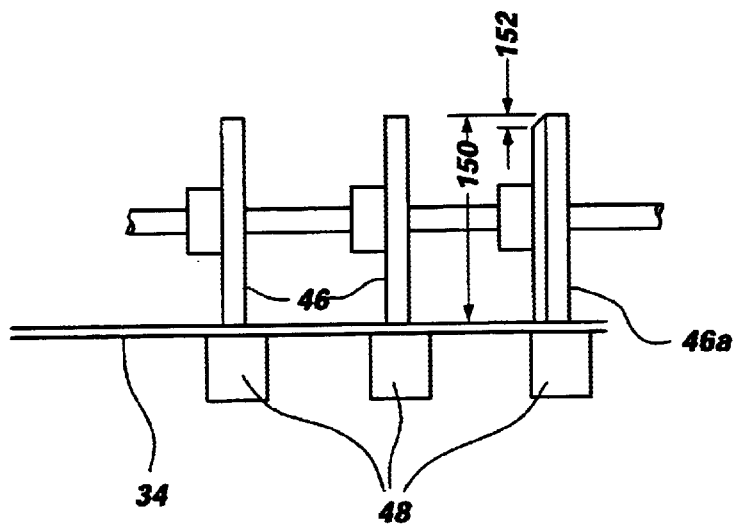
FIG. 5A shows a frontal view of a support roller of the furnace of FIG. 1.

PATENT NO.        : 6,685,879 B2                                              Page 1 of 2
APPLICATION NO.   : 09/736515
DATED             : February 3, 2004
INVENTOR(S)       : Peterson It is certified that error appears in the above-identified patent and that said Letters Patent is hereby corrected as shown below:

On drawing sheet 5 of 9, replace FIG. 5A with:
As shown in attached

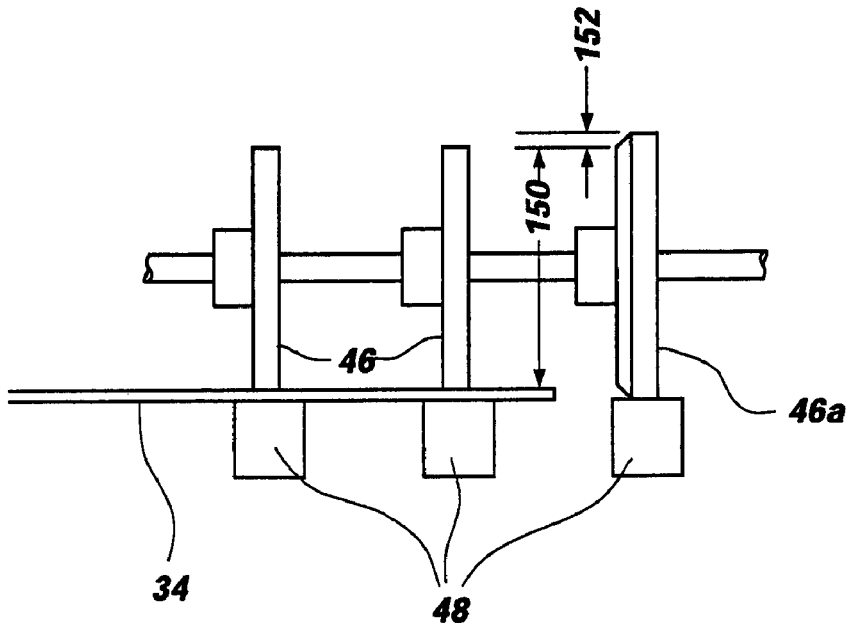

FIG. 5A

Signed and Sealed this

Fifteenth Day of January, 2008

JON W. DUDAS
*Director of the United States Patent and Trademark Office*